United States Patent
Shikatani

(10) Patent No.: US 7,249,137 B1
(45) Date of Patent: Jul. 24, 2007

(54) STORAGE-TYPE BROADCAST SYSTEM, TRANSMITTER AND RECEIVER

(75) Inventor: Yukio Shikatani, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 353 days.

(21) Appl. No.: 09/869,116

(22) PCT Filed: Oct. 20, 2000

(86) PCT No.: PCT/JP00/07341

§ 371 (c)(1),
(2), (4) Date: Jun. 25, 2001

(87) PCT Pub. No.: WO01/31815

PCT Pub. Date: May 3, 2001

(30) Foreign Application Priority Data

Oct. 26, 1999 (JP) .................... 11-304591

(51) Int. Cl.
*G06F 17/00* (2006.01)
(52) U.S. Cl. ............. 707/102; 707/101; 707/104.1
(58) Field of Classification Search ............. 707/104.1, 707/100; 455/3.05; 725/2
See application file for complete search history.

(56) References Cited

U.S. PATENT DOCUMENTS

| | | | |
|---|---|---|---|
| 5,359,601 A | | 10/1994 | Wasilewski et al. |
| 5,678,172 A | * | 10/1997 | Dinkins ............ 455/3.05 |
| 6,035,304 A | | 3/2000 | Machida et al. |
| 6,356,903 B1 | * | 3/2002 | Baxter et al. ............ 707/10 |
| 6,366,914 B1 | * | 4/2002 | Stern ............ 707/10 |
| 6,473,752 B1 | * | 10/2002 | Fleming, III ............ 707/4 |

FOREIGN PATENT DOCUMENTS

| | | |
|---|---|---|
| EP | 0 835 004 | 4/1998 |
| JP | 10-13811 | 1/1998 |
| JP | 11-196390 | 6/1999 |
| JP | 11-177944 | 7/1999 |

OTHER PUBLICATIONS

"*Mitsubishi Denki Gihou*", vo. 72, No. 8, Aug. 1998, Sachio Yokoyama et al., "*Digital Housou wo Sasaeru Sentan Gijutsu*", pp. 57-62.

\* cited by examiner

*Primary Examiner*—Sana Al-Hashemi
(74) *Attorney, Agent, or Firm*—Pearne & Gordon LLP

(57) ABSTRACT

Providing a broadcast system wherein storage of contents on the receiving side and use restriction on the stored contents, etc. can be performed per service provided by contents providers. In a storage-based digital broadcast system wherein contents transmitted from a sending side are stored on a receiving side then reproduced, the sending side transmits service structure information for describing relational structure between services provided by contents providers and reference information for associating the contents with the service structure information in advance, and the receiving side receives and stores service structure information and reference information and uses the received service structure information and reference information to manage storage of contents. It is possible to control contents per service based on service structure information and information that can be reorganized from reference information.

24 Claims, 37 Drawing Sheets

FIG. 13

| HOME NODE | PARENT NODE |
|---|---|
| CONTENTS PROVIDER 1 | |
| SERVICE A | CONTENTS PROVIDER 1 |
| SERVICE B | CONTENTS PROVIDER 1 |
| SERVICE C | CONTENTS PROVIDER 1 |
| SERVICE D | CONTENTS PROVIDER 1 |

FIG. 14

| HOME NODE | REFERENCE DESTINATION |
|---|---|
| DATA CONTENT 1 | SERVICE A |
| DATA CONTENT 2 | SERVICE A |
| DATA CONTENT 3 | SERVICE B |
| DATA CONTENT 4 | SERVICE C |
| DATA CONTENT 5 | SERVICE C |
| DATA CONTENT 6 | SERVICE C |
| AV CONTENT 1 | SERVICE A |
| AV CONTENT 2 | SERVICE C |
| AV CONTENT 3 | SERVICE C |
| AV CONTENT 4 | SERVICE D |

| HOME NODE | PARENT NODE |
| --- | --- |
| CONTENTS PROVIDER | |
| SERVICE A | CONTENTS PROVIDER |
| SERVICE B | SERVICE A |
| SERVICE C | SERVICE A |

FIG. 20

| HOME NODE | REFERENCE DESTINATION | AUTOMATIC STORAGE FLAG |
|---|---|---|
| DATA CONTENT 1 | SERVICE A | ○ |
| DATA CONTENT 2 | SERVICE A | |
| DATA CONTENT 3 | SERVICE B | |
| DATA CONTENT 4 | SERVICE C | ○ |
| DATA CONTENT 5 | SERVICE C | |
| DATA CONTENT 6 | SERVICE C | |
| AV CONTENT 1 | SERVICE A | |
| AV CONTENT 2 | SERVICE C | ○ |
| AV CONTENT 3 | SERVICE C | |
| AV CONTENT 4 | SERVICE D | ○ |

DEPENDS ON THE NEAREST VALIDITY TERM OF CONTENTS:
NEWS: VALID UNTIL 1999/10/02
SPORTS: VALID UNTIL 1999/10/10
DRAMA: VALID UNTIL 1999/10/20

FIG. 36

| FLAG | DEFINITION |
|---|---|
| INFORMATION PROVIDER IDENTIFIER OF COMPANY A (Information_provider_id) | 0 x 0001 |
| SERVICE PROVIDED  A service  (node_id) | 0 x 0010 |
| SERVICE PROVIDED   B service  (node_id) | 0 x 0020 |
| SERVICE PROVIDED  C service  (node_id) | 0 x 0030 |
| REFERENCE OF CONTENT A  (information_provider_id) | 0 x 0001 |
| REFERENCE OF CONTENT A  (event_relation_id) | 0 x 0001 |
| REFERENCE OF CONTENT A  (node_id) | 0 x 0010 |
| REFERENCE OF CONTENT B  (information_provider_id) | 0 x 0001 |
| REFERENCE OF CONTENT B  (event_relation_id) | 0 x 0001 |
| REFERENCE OF CONTENT B  (node_id) | 0 x 0010 |
| REFERENCE OF CONTENT C  (information_provider_id) | 0 x 0001 |
| REFERENCE OF CONTENT C  (event_relation_id) | 0 x 0001 |
| REFERENCE OF CONTENT C  (node_id) | 0 x 0020 |
| REFERENCE OF CONTENT D  (information_provider_id) | 0 x 0001 |
| REFERENCE OF CONTENT D  (event_relation_id) | 0 x 0001 |
| REFERENCE OF CONTENT D  (node_id) | 0 x 0030 |

FIG. 37

| DATA STRUCTURE | DESCRIPTION |
|---|---|
| event_relation_section(){ | |
|   table_id | 0 x D1 (PROGRAM GROUP INDEX: ERT) |
|   section_syntax_indicator | 1 |
|   reserved | |
|   section_length | |
|   event_relation_id | 0 x 0001 (STORAGE-BASED BROADCAST SERVICE) |
|   reserved | |
|   version_number | |
|   current_next_indicator | |
|   section_number | |
|   last_section_number | |
|   information_provider_id | 0 x 0001 (IDENTIFICATION VALUE ASSIGNED TO COMPANY A) |
|   relation_type | 0 x 3 (SERVICE DESCRIPTION) |
|   reserved_future_use | |
|     node_id | 0 x 0000 |
|     collection_mode | 0 x 0 (SET) |
|     reserved_future_use | |
|     parent_node_id | 0 x FFFF (MULTI-ROUTE NODE) |
|     reference_number | 0 x FFFF (INVALID) |
|     reserved_future_use | |
|     descriptors_loop_length | |
|       descriptor_tag | 0 x D3 (SHORT FORM NODE INFORMATION DESCRIPTOR) |
|       descriptor_length | |
|       ISO_639_language_code | "jpn" |
|       node_name_length | |
|       node_name | "COMPANY A" |
|       text_length | |
|       text_char | ARBITRARY |
|     node_id | 0 x 0010 |
|     collection_mode | 0 x 0 (SET) |
|     reserved_future_use | |
|     parent_node_id | 0 x FFFF (MULTI-ROUTE NODE) |
|     reference_number | 0 x FFFF (INVALID) |
|     reserved_future_use | |
|     descriptors_loop_length | |
|       descriptor_tag | 0 x D3 (SHORT FORM NODE INFORMATION DESCRIPTOR) |
|       descriptor_length | |
|       ISO_639_language_code | "jpn" |
|       node_name_length | |
|       node_name | "SERVICE A" |
|       text_length | |
|       text_char | ARBITRARY |
|     node_id | 0 x 0020 |
|     collection_mode | 0 x 0 (SET) |
|     reserved_future_use | |
|     parent_node_id | 0 x FFFF (MULTI-ROUTE NODE) |
|     reference_number | 0 x FFFF (INVALID) |
|     reserved_future_use | |
|     descriptors_loop_length | |
|       descriptor_tag | 0 x D3 (SHORT FORM NODE INFORMATION DESCRIPTOR) |
|       descriptor_length | |
|       ISO_639_language_code | "jpn" |
|       node_name_length | |
|       node_name | "SERVICE B" |
|       text_length | |
|       text_char | ARBITRARY |
|     node_id | 0 x 0030 (SET) |
|     collection_mode | |
|     reserved_future_use | 0 x FFFF (MULTI-ROUTE NODE) |
|     parent_node_id | 0 x FFFF (INVALID) |
|     reference_number | |
|     reserved_future_use | |
|     descriptors_loop_length | |
|       descriptor_tag | 0 x D3 (SHORT FORM NODE INFORMATION DESCRIPTOR) |
|       descriptor_length | |
|       ISO_639_language_code | "jpn" |
|       node_name_length | |
|       node_name | "SERVICE C" |
|       text_length | |
|       text_char | ARBITRARY |
|   CRC_32 | |
| } | |

FIG. 38

| FLAG | DEFINITION |
|---|---|
| CONTENT A OF SERVICE A (content_id) | 0 x 0010 |
| CONTENT B OF SERVICE A (content_id) | 0 x 0011 |
| CONTENT C OF SERVICE B (content_id) | 0 x 0020 |
| CONTENT D OF SERVICE C (content_id) | 0 x 0030 |

FIG. 39

| DATA STRUCTURE | DESCRIPTION |
|---|---|
| reference_descriptor(){<br>  descriptor_tag<br>  descriptor_length<br>  information_provider_id<br>  event_relation_id<br>  reference_node_id<br>  reference_number<br>  last_reference_number<br>} | <br>0 x D1 (REFERENCE DESCRIPTOR)<br>TOTAL BYTE LENGTH OF ALL THE SUBSEQUENT DESCRIPTORS<br>0 x 0001 (IDENTIFICATION VALUE ASSIGNED TO COMPANY A)<br>0 x 0001 (STORAGE-BASED BROADCASET SERVICE)<br>0 x 0010 (SERVICE A)<br>0 x FF (NOT USED)<br>0 x FF (NOT USED) |

FIG. 40

| DATA STRUCTURE | DESCRIPTION |
|---|---|
| reference_descriptor(){<br>  descriptor_tag<br>  descriptor_length<br>  information_provider_id<br>  event_relation_id<br>  reference_node_id<br>  reference_number_id<br>  last_reference_number<br>} | <br>0 x D1 (REFERENCE DESCRIPTOR)<br>TOTAL BYTE LENGTH OF ALL THE SUBSEQUENT DESCRIPTORS<br>0 x 0001 (IDENTIFICATION VALUE ASSIGNED TO COMPANY A)<br>0 x 0001 (STORAGE-BASED BROADCASET SERVICE)<br>0 x 0020 (SERVICE B)<br>0 x FF (NOT USED)<br>0 x FF (NOT USED) |

FIG. 41

| DATA STRUCTURE | DESCRIPTION |
|---|---|
| reference_descriptor(){<br>  descriptor_tag<br>  descriptor_length<br>  information_provider_id<br>  event_relation_id<br>  reference_node_id<br>  reference_number<br>  last_reference_number<br>} | <br>0 x D1 (REFERENCE DESCRIPTOR)<br>TOTAL BYTE LENGTH OF ALL THE SUBSEQUENT DESCRIPTORS<br>0 x 0001 (IDENTIFICATION VALUE ASSIGNED TO COMPANY A)<br>0 x 0001 (STORAGE-BASED BROADCASET SERVICE)<br>0 x 0030 (SERVICE C)<br>0 x FF (NOT USED)<br>0 x FF (NOT USED) |

FIG. 42

| DATA STRUCTURE | NUMBER OF BITS | BIT STRING NOTATION |
|---|---|---|
| arib_bxml_info(){ | | |
|     transmission_format | 2 | bslbf |
|     reserved_future_use | 1 | bslbf |
|     auto_start_flag | 1 | bslbf |
|     document_resolution | 4 | bslbf |
|     use_xml | 1 | bslbf |
|     default_version_flag | 1 | bslbf |
|     independent_flag | 1 | bslbf |
|     content_id_flag | 1 | bslbf |
|     reserved_future_use | 3 | bslbf |
|     update_flag | 1 | bslbf |
|     ISO_639_language_code | 24 | bslbf |
|     if (content_id_flag==1){ | | |
|         content_id | 32 | uimsbf |
|         content_version | 16 | uimsbf |
|     } | | |
|     if (default_version_flag==0){ | | |
|         bml_major_version | 16 | uimsbf |
|         bml_minor_version | 16 | uimsbf |
|         if (use_xml==1){ | | |
|             bxml_major_version | 16 | uimsbf |
|             bxml_minor_version | 16 | uimsbf |
|         } | | |
|     } | | |
|     if (transmission_format=='00'){ | | |
|         num_of_carousels | 8 | uimsbf |
|         for(i=0;i<N;i++){ | | |
|             component_tag | 8 | uimsbf |
|             event_section_flag | 1 | |
|             reserved_future_use | 3 | |
|             component_size_flag | 1 | |
|             default_transaction_id_flag | 1 | |
|             default_timeout_DII_flag | 1 | |
|             default_leak_rate_flag | 1 | |
|             if (component_size_flag=='1'){ | | |
|                 component_size | 32 | uimsbf |
|             } | | |
|             if (default_transation_id_flag) | | |
|                 transaction_id | 32 | uimsbf |
|             } | | |
|             if (default_timeout_DII_flag){ | | |
|                 timeout_value_DII | 32 | uimsbf |
|             } | | |
|             if (default_leak_rate_flag){ | | |
|                 leak_rate | 22 | uimsbf |
|                 reserved | 2 | bslbf |
|             } | | |
|         } | | |
|         ondemand_reserved_flag | 1 | bslbf |
|         file_storable_flag | 1 | bslbf |
|         content_provider_flag | 1 | bslbf |
|         reserved_future_use | 5 | bslbf |
|         if (file_storable_flag=0){ | | |
|             auto_storage_flag | 1 | bslbf |
|             content_storage_type | 4 | uimsbf |
|             reserved_future_use | 3 | bslbf |
|         } | | |
|         if (content_provider_flag=1){ | | |
|         content_provider_descriptors_length | 12 | uimsbf |
|             reserved_future_use | 4 | bslbf |
|             for (i=0;i<2N;i++){ | | |
|                 descriptors() | | |
|             } | | |
|         } | | |
|     } | | |
| } | | |

FIG. 43

| FLAG | DEFINITION |
|---|---|
| STORAGE-BASED BROADCAST SERVICE IDENTIFIER (ERT: event_relation_id) | 0 x 0001 |
| SERVICE DESCRIPTION (ERT: relation_type) | 0 x 3 |

FIG. 44

| DATA STRUCTURE | NUMBER OF BITS | BIT STRING NOTATION |
|---|---|---|
| event_information_section(){ | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   service_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   transport_stream_id | 16 | uimsbf |
|   original_network_id | 16 | uimsbf |
|   segment_last_section_number | 8 | uimsbf |
|   last_table_id | 8 | uimsbf |
|   for(i=0;i<N;i++){ | | |
|     event_id | 16 | uimsbf |
|     start_time | 40 | bslbf |
|     duration | 24 | uimsbf |
|     running_status | 3 | uimsbf |
|     free_CA_mode | 1 | bslbf |
|     descriptors_loop_length | 12 | uimsbf |
|     for(i=0;i<N;i++){ | | |
|       descriptor() | | |
|     } | | |
|   } | | |
|   CRC_32 | 32 | rpchof |
| } | | |

FIG. 45

| DATA STRUCTURE | NUMBER OF BITS | BIT STRING NOTATION |
|---|---|---|
| data_content_descriptor(){ | | |
|   descriptor_tag | 8 | uimsbf |
|   descriptor_length | 8 | uimsbf |
|   data_component_id | 16 | uimsbf |
|   entry_component. | 8 | uimsbf |
|   selector_length | 8 | uimsbf |
|   for(i=0;i<N;i++){ | | |
|     selector_byte | 8 | uimsbf |
|   } | | |
|   num_of_component_ref | 8 | uimsbf |
|   for(i=0;i<num_of_component_ref;i++){ | | |
|     component_ref | 8 | uimsbf |
|   } | | |
|   ISO_639_language_code | 24 | bslbf |
|   text_length | 8 | uimsbf |
|   for(i=0;i<N;i++){ | | |
|     text_char | 8 | uimsbf |
|   } | | |
| } | | |

FIG. 46

| DATA STRUCTURE | NUMBER OF BITS | BIT STRING NOTATION |
|---|---|---|
| event_relation_section(){ | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   event_relation_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   information_provider_id | 16 | uimsbf |
|   relation_type | 4 | uimsbf |
|   reserved_future_use | 4 | bslbf |
|   for(i=0;i<N;i++){ | | |
|     node_id | 16 | uimsbf |
|     collection_mode | 4 | uimsbf |
|     reserved_future_use | 4 | bslbf |
|     parent_node_id | 16 | uimsbf |
|     reference_number | 8 | uimsbf |
|     reserved_future_use | 4 | bslbf |
|     descriptors_loop_length | 12 | uimsbf |
|     for(i=0;i<N;i++){ | | |
|       descriptor() | | |
|     } | | |
|   } | | |
|   CRC_32 | | |
| } | 32 | rpchof |

FIG. 47

| DATA STRUCTURE | NUMBER OF BITS | BIT STRING NOTATION |
|---|---|---|
| reference_descriptor(){ | | |
|   descriptor_tag | 8 | uimsbf |
|   descriptor_length | 8 | uimsbf |
|   information_provider_id | 16 | uimsbf |
|   event_relation_id | 16 | uimsbf |
|   for(i=0;i<N;i++){ | | |
|     reference_node_id | 16 | uimsbf |
|     reference_number | 8 | uimsbf |
|     last_reference_number | 8 | uimsbf |
|   } | | |
| } | | |

STORAGE-TYPE BROADCAST SYSTEM, TRANSMITTER AND RECEIVER

BACKGROUND OF THE INVENTION

1. Field of the Invention

The present invention relates to a storage-based digital broadcast system that receives and stores data contents and AV (Audio-Visual) contents on the receiving side sent from the sending side and reproduces the data contents and AV contents, etc. in viewing, and a transmitter and a receiver used in the system, and in particular to a storage-based digital broadcast system wherein storage of contents on the receiving side and use restriction on the stored contents, etc. can be controlled per service provided by contents providers, and a transmitter and a receiver used in the system.

2. Description of the Related Art

In digital broadcasts, storage-based broadcast systems have been developed where programs and contents transmitted from the sending side are received and stored on the receiving side and users reproduce to view the programs and contents when it is convenient for them.

In this broadcast system, broadcast programs and the associated program additional information (contents) are transmitted and SI (Service Information) such as EIT (Event Information Table) and LIT (Local event Information Table) to define program scenes and ERT (Event Relation Table) to define relationship between scenes are broadcast as guidance information on programs, etc. On the receiving side, it is possible to receive and store broadcast programs and contents and use SI to reproduce for example only news programs from among stored programs and contents or to view a particular scene of a program.

In the future digital broadcasts, a broadcast form is expected where providers that create and provide contents will be separated from broadcast operators and that broadcast operators will only multiplex and transmit contents provided by contents providers.

Information indicating a contents provider and information on the services to which the contents belong will be described for individual contents.

The Japanese Patent Laid-Open No. H07-177109/(1995) indicates adding codes to a plurality of information pieces and determining the priority of display that is based on each code. A code used in this disclosure has an inherent meaning so that the meaning of the code cannot be changed later.

Terms used herein will be defined below.

AV (Audio-Visual) data: Stream format data such as image, voice and subtitle data.

Data contents: Non-stream format data associated with broadcast programs. For example, HTML, XML, BML, moving pictures (MPEG and MOV), still pictures (JPEG, GIF) are included. Individual contents can be identified using identifiers.

AV contents: AV data related to data contents among AV data. Individual AV contents can be identified using identifiers.

Contents: Data contents and AV contents, which partially reference each other.

Service: Information that groups contents.

In related art storage-based broadcast system s, it is not easily possible to automatically store in a receiver the contents that belong to a service provided by a contents provider, nor set or change the validity term of contents stored in the receiver for each service provided by the contents provider.

In case wishing to execute such processing in a related art system, it is necessary to describe information on the contents provider and the service to which the contents belong for individual program and all the contents. This results in transmission of huge data thus worsening the transmission efficiency.

In a related art system, it is impossible to describe the relationship between a plurality of contents providers to which the contents are related, or describe the relationship between a plurality of programs or contents that relate to each other.

In case a single provider is concerned, the contents are transmitted in various forms from various broadcast operators or in various service forms from a single broadcast operator, or separately with shifted timings due to limited transmission bandwidth. In this way, it is difficult to receive contents with the structure (relationship between contents) intended by the provider maintained.

Appending data that indicates the corresponding service to contents prevents change of service.

The invention solves such problems and aims at providing a broadcast system where storage of contents on the receiving side and use restriction on the stored contents, etc. can be implemented per service provided by contents providers and a transmitter and receiver used in the system.

BRIEF SUMMARY OF THE INVENTION

According to the invention, in a stored digital broadcast system where contents transmitted from the sending side are stored on the receiving side then reproduced or displayed, the sending side transmits service structure information for describing relational structure between services provided by contents providers and reference information for associating the contents with the service structure information, and the receiving side uses the received service structure information and reference information to manage storage of contents.

A transmitter according to the invention comprises service structure information generating means for generating service structure information representing the relational structure between services provided by contents providers, reference information generating means for generating reference information associating contents with service structure information, service information adding means for adding reference information to service information, and multiplexing/transmission means for multiplexing service information containing reference information and service structure information into data contents and AV data and transmitting the resulting data.

A receiver according to the invention comprises receiving/demultiplexing means for demultiplexing contents, service structure information describing the relational structure between services provided by contents providers and service information containing reference information associating contents with service structure information from received signals, contents storage means for storing demultiplexed contents, service structure storage means for storing demultiplexed service structure information, service information storage means for storing demultiplexed service information, and service management means for managing storage of contents by using service structure information and reference information.

Thus, it is possible to control contents per service based on service structure information and information that can be reorganized from reference information.

BRIEF DESCRIPTION OF THE DRAWINGS

FIG. 13 shows service structure information according to the first embodiment;

FIG. 14 shows reference information according to the first embodiment;

FIG. 20 shows service information with an automatic storage flag appended according to the third embodiment;

FIG. 36 shows items to be defined by an information provider;

FIG. 37 shows an example of creating ERT according to the sixth embodiment;

FIG. 38 shows an example of contents identification by a broadcast operator;

FIG. 39 shows an example of creating reference descriptors for contents A, B according to the sixth embodiment;

FIG. 40 shows an example of creating a reference descriptor for contents C according to the sixth embodiment;

FIG. 41 shows an example of creating a reference descriptor for contents D according to the sixth embodiment;

FIG. 42 shows the expanded EIT data contents descriptor according to the sixth embodiment;

FIG. 43 shows description in the storage-based broadcast service related information;

FIG. 44 shows the EIT data structure;

FIG. 45 shows the data structure of the data contents descriptor;

FIG. 46 shows the data structure of ERT;

FIG. 47 shows the data structure of the reference descriptor.

DETAILED DESCRIPTION OF THE INVENTION

Figure 1:
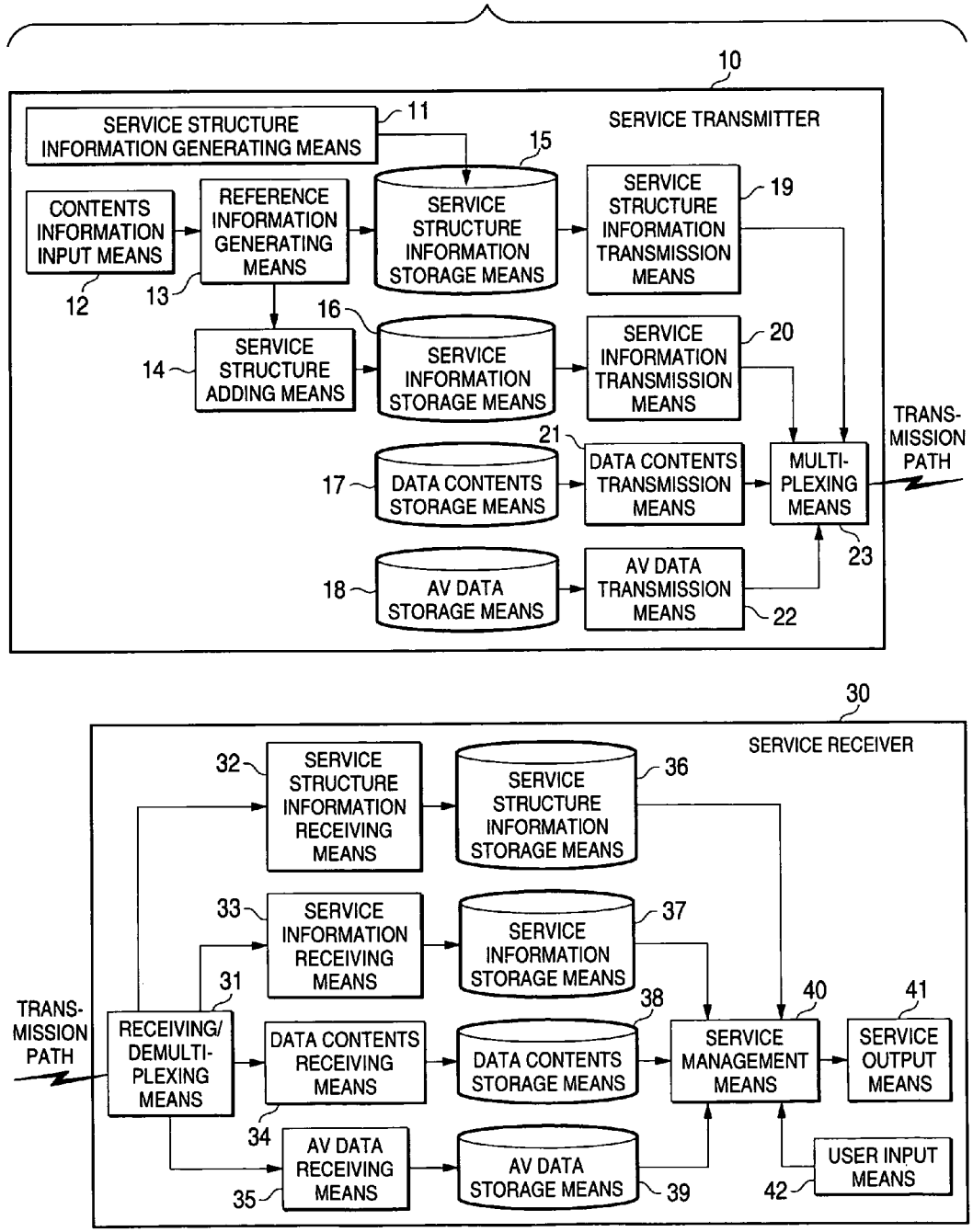
FIG. 1 is a block diagram showing the configuration of a broadcast system according to a first embodiment of the invention.

Referring to numerals in the figures, 10 represents service transmitter, 11 service structure information generating means, 12 contents information input means, 13 reference information generating means, 14 service information adding means, 15 service structure information storage means, 16 service information storage means, 17 data contents storage means, 18 AV data storage means, 19 service structure information transmission means, 20 service information transmission means, 21 data contents transmission means, 22 AV data transmission means, 23 multiplexing means, 30 service receiving means, 31 receiving/demultiplexing means, 32 service structure information storage means, 33 service information receiving means, 34 data contents receiving means, 35 AV data receiving means, 36 service structure information storage means, 37 service information storage means, 38 data contents storage means, 39 AV data storage means, 40 service management means, 41 service output means, and 42 user input means.

In the first embodiment, a broadcast system consisting of a service transmitter 10 and a service receiver 30 will be described referring to FIG. 1. A contents provider groups contents to be provided (classifies contents into services) and passes the contents of each service to a broadcast operator for broadcasting. The service transmitter 10 transmits the contents together with additional information and comprises AV data storage means 18 for storing AV data provided by the contents provider, contents storage means for storing data contents provided by the contents provider, service structure information generating means 11 for generating service structure information containing structure information (service structure information) specifying the relationship between the data provider and the contents and the relationship between services as well as information indicating the type of the structure information, service structure information storage means 15 for storing the service structure information, contents information input means 12 for inputting an identifier (contents identifier) for identifying the contents, reference generating means 13 for generating information (reference information) to associate contents identifiers grouped into services in the service structure information, service information adding means 14 for adding reference information to service information (SI or PSI (Program Specific Information) for transmitting programs), service information storage means 16 for storing service information containing the reference information, AV data transmission means 22 for extracting AV data to be sent from AV data storage means 18, data contents transmission means 21 for extracting data contents to be sent from data contents storage means 17, service information transmission means 20 for extracting service information to be sent from service information storage means 16, service structure information transmission means 19 for extracting service structure information to be sent from service structure information storage means 15, and multiplexing means 23 for selecting AV data, data contents, service information and service structure information about to be sent based on the service information received in advance from the service information transmission means 20, converting the information to respective transmission formats to correspond to transmission paths, and multiplexing and transmitting onto transmission paths the data as transmission AV data, transmission data contents, transmission service information and transmission service structure information.

The multiplexing means converts, for example, AV data to PES data, data contents to object carousels or data carousels (DDB, DII, etc.) or event messages as DSM-CC Section, service information to SI/PSI data structure (PAT, PMT, NIT, SDT, EIT, various descriptors, etc.) conforming to the ARIB-STD B10 version 1.2, and service structure information to ERT conforming to the ARIB-STD B10 version 1.2. The service structure information may be converted to XML as data contents for transmission.

AV data stored in the AV data storage means 18 may correspond to each program on a one-to-one basis, one-to-many basis or many-to-many basis.

The service receiver 30 comprises receiving/demultiplexing means 31 for receiving data transmitted from the service transmitter 10 and demultiplexing the data into AV data, data contents, service information and service structure information, AV data receiving means 35 for converting transmission AV data received from the receiving/demultiplexing means 31 to AV data to be stored/managed, data contents receiving means 34 for converting transmission data contents received from the receiving/demultiplexing means 31 to data contents to be stored/managed, service information receiving means 33 for converting transmission service information received from the receiving/demultiplexing means 31 to service information to be stored/managed, service structure information receiving means 32 for converting transmission service structure information received from the receiving/demultiplexing means 31 to service structure information to be stored/managed, AV data storage means 39 for storing converted AV data, data contents storage means 38 for storing converted data contents, service information storage means 27 for storing converted service information, service structure information storage means 36 for storing converted service structure information, service management means for reading AV data, data contents, service information and service structure information and performing per-service processing based on the type of the service structure information, user input means 42 for the user to enter instructions, and service output means 41 for outputting data read by the service management means 40 according to the instruction entered by the user.

Next, details of service structure information and reference information will be described.

Figure 10:
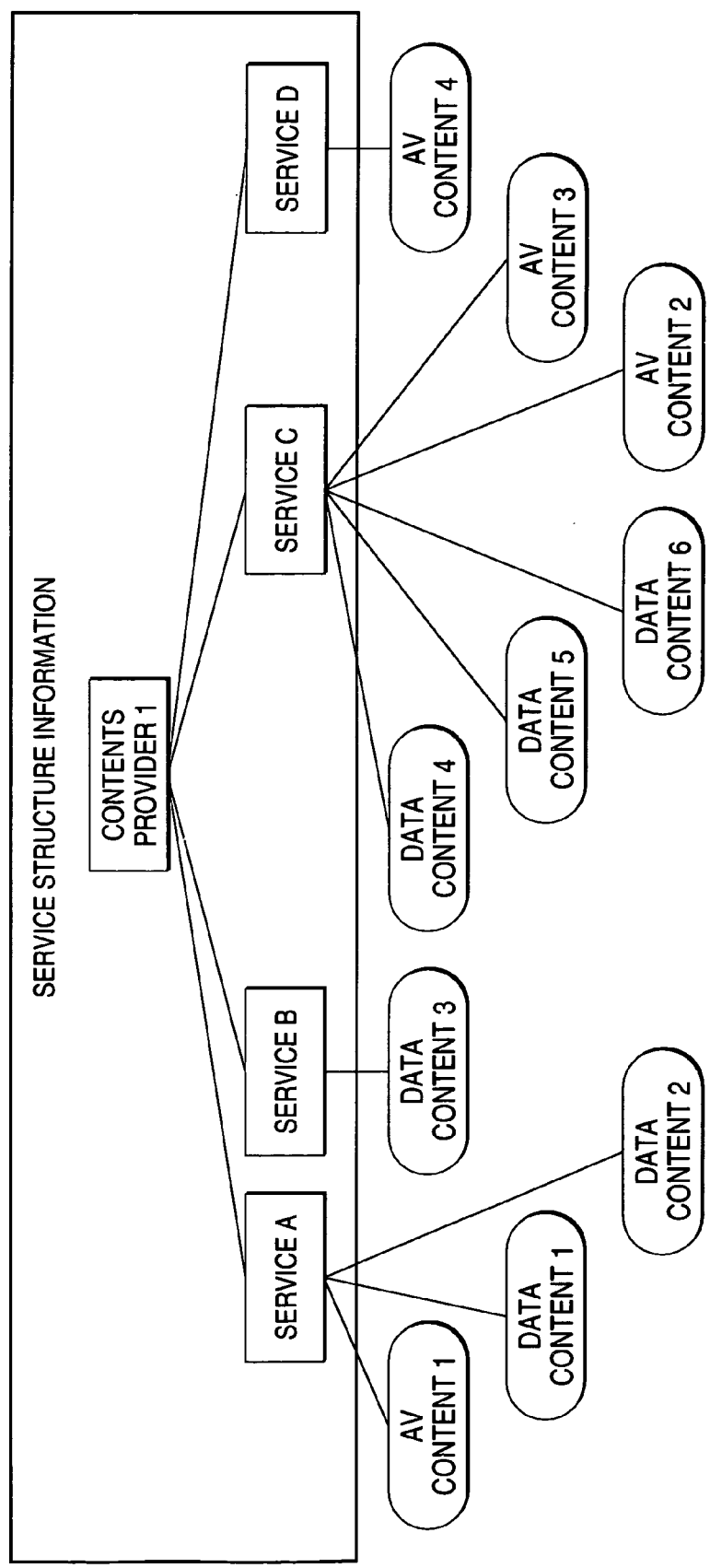
FIG. 10 shows data addition service structure information according to the first embodiment.
Figure 11:
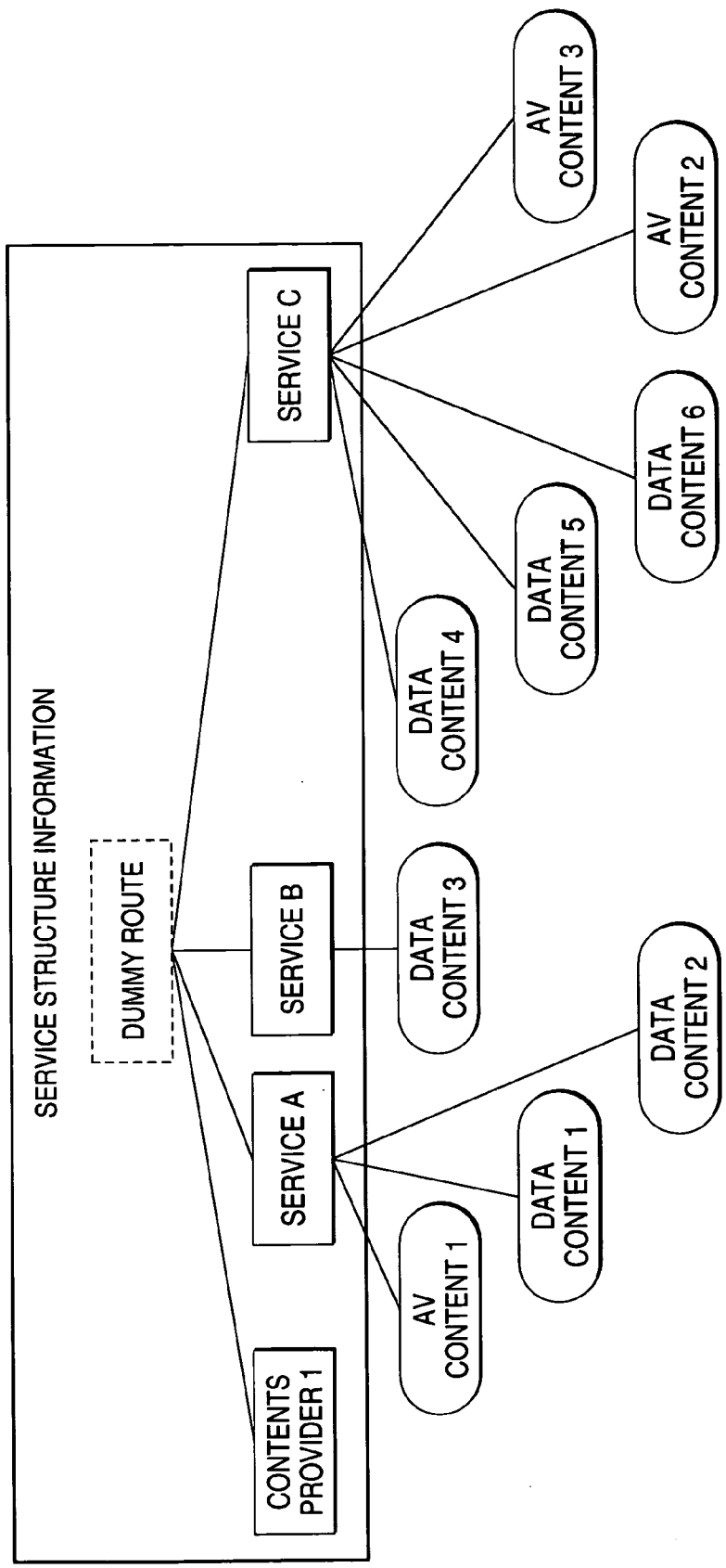
FIG. 11 shows data addition service structure information with the dummy route at the top according to the first embodiment.
Figure 12:
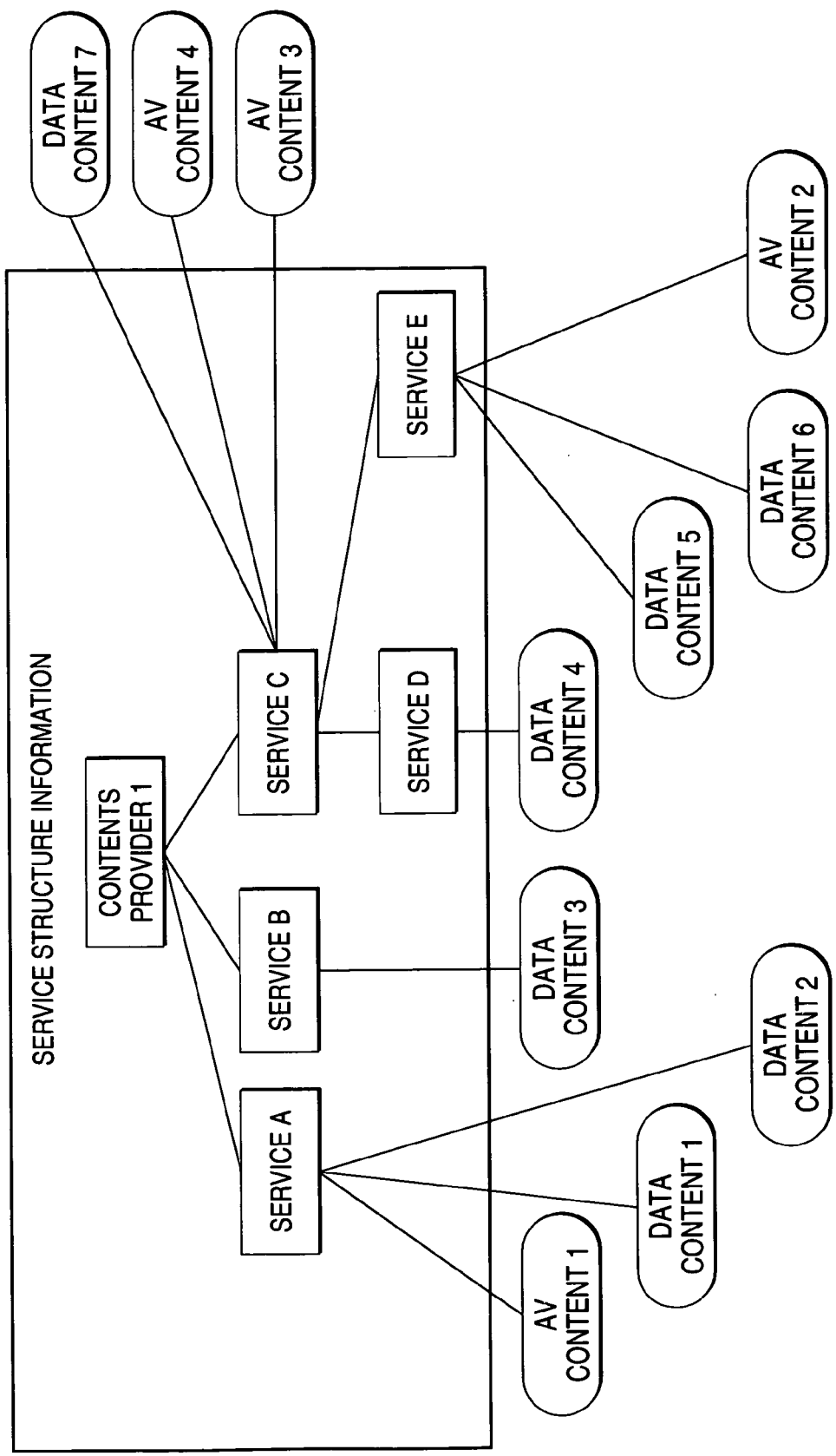
FIG. 12 shows other data addition service structure information according to the first embodiment.

The service structure information represents a contents provider and one or more services provided by the contents provider in a tree structure as shown in FIGS. 10, 11 and 12. Concerning the services in the service structure information, service structure information that associates grouped data contents or AV contents is referred to as data addition service structure information. In this case, the relationship between data contents or AV contents and the nodes of a tree structure that groups them is referred to as reference information.

For service structure information in FIG. 10, Contents Provider 1 is at the top of a tree. Four services, Service A, Service B, Service C and Service D are child nodes of Contents Provider 1. Data details of the service structure information are shown in FIG. 13

Reference information shows that AV Content 1, Data Content 1 and Data Content 2 belong to Service A, Data Content 3 to Service B, AV Content 2, AV Content 3, Data Content 4, Data Content 5 and Data Content 6 to Service C, and AV Content 4 to Service D. Data details of the reference information are shown in FIG. 14.

For example, Data Content 1 is a data content provided by Contents Provider 1 and belongs to Service A provided by Contents Provider 1. AV Content 4 is an AV content provided by Contents Provider 1 and belongs to Service D provided by Contents Provider 1.

Data addition service structure information in FIG. 11 differs from the data addition service structure information in FIG. 10 in terms of positioning of Contents Provider 1 in the tree structure. In FIG. 11, Contents Provider 1 is not at the top of the tree of data addition service structure information but positioned as a particular node in the tree structure. Meaning of Service A, Data Content 1 or AV Content 4 is the same as in FIG. 10. Representation in FIG. 11 may be used instead of FIG. 10.

FIG. 12 shows a service structure information where hierarchical relationship is found between services. In the figure, Service D and Service E are child elements of Service C.

Processing of the service transmitter 10 will be described.

Figure 2:
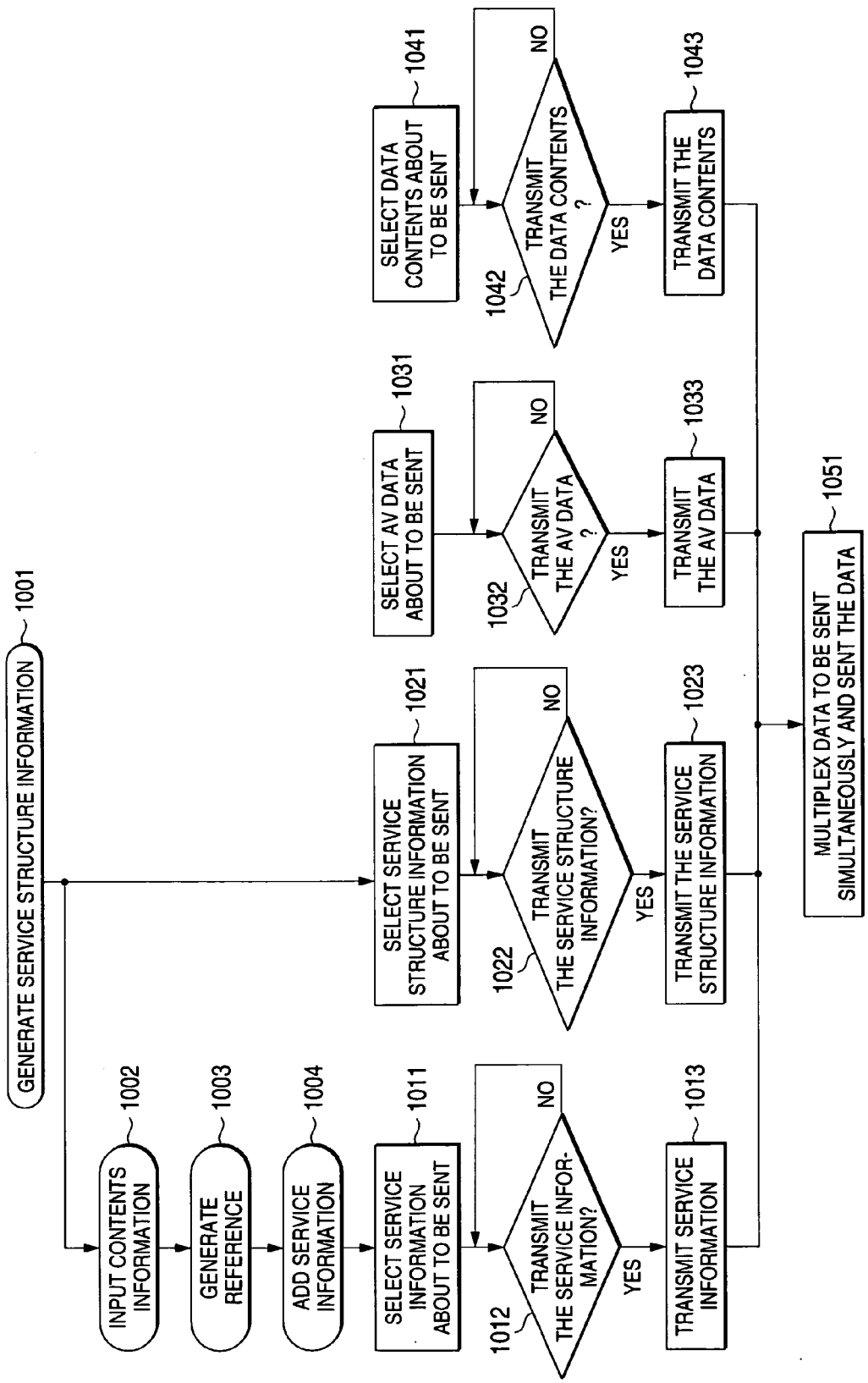
FIG. 2 is a flowchart showing the operation of a transmitter of a broadcast system according to the first embodiment.

FIG. 2 shows the processing procedure of the service transmitter 10.

Step 1001: The service structure information generating means 11 generates service structure information as shown in FIGS. 10, 11 and 12. Particular processing procedure will be described later.

Step 1002: Next, the contents information input means 12 inputs contents information. Particular processing procedure will be described later.

Step 1003: The reference generating means 13 generates reference information to associate service structure information generated in step 1001 with contents information input in step 1002. Particular processing procedure will be described later.

Step 1004: The service information adding means 14 adds reference information generated in step 1003 to service information such as SI and PSI. Particular processing procedure will be described later.

Step 1011: The service information transmission means 20 selects service information about to be sent from the service information storage means 16.

Step 1012: The service information transmission means 20 determines whether to transmit the service information.

Step 1013: The service information transmission means 20 passes the service information to the multiplexing/transmission means 23.

Step 1021: The service structure information transmission means 19 selects service structure information about to be sent from the service structure information storage means 15.

Step 1022: The service structure information transmission means 19 determines whether to transmit the service structure information.

Step 1023: The service structure information transmission means 19 passes the service structure information to the multiplexing/transmission means 23.

Step 1031: The AV data transmission means 22 selects AV data about to be sent from the AV data storage means 18.

Step 1032: The AV data transmission means 22 determines whether to transmit the AV data.

Step 1033: The AV data transmission means 22 passes the AV data to the multiplexing/transmission means 23.

Step 1041: The data contents transmission means 21 selects data contents about to be sent from the data contents storage means 17.

Step 1042: The data contents transmission means 21 determines whether to transmit the data contents.

Step 1043: The data contents transmission means 21 passes the data contents to the multiplexing/transmission means 23.

Step 1051: The multiplexing/transmission means 23 converts received service information, service structure information, AV data and data contents to transmission formats predetermined by the respective transmission paths, multiplexes the data according to transmission times and transmits respective data onto transmission paths. A transmission schedule may be appended to arbitrary service structure information and selection may be made according to the transmission schedule in step 1021. Also, a transmission schedule may be appended to arbitrary data contents and selection may be made according to the transmission schedule in step 1041.

Steps 1011, 1021, 1031 and 1041 depend on transmission times of respective data and are processed asynchronously.

Conversion of data to transmission formats in step 1051 may be made in a process before step 1051.

Figure 3:
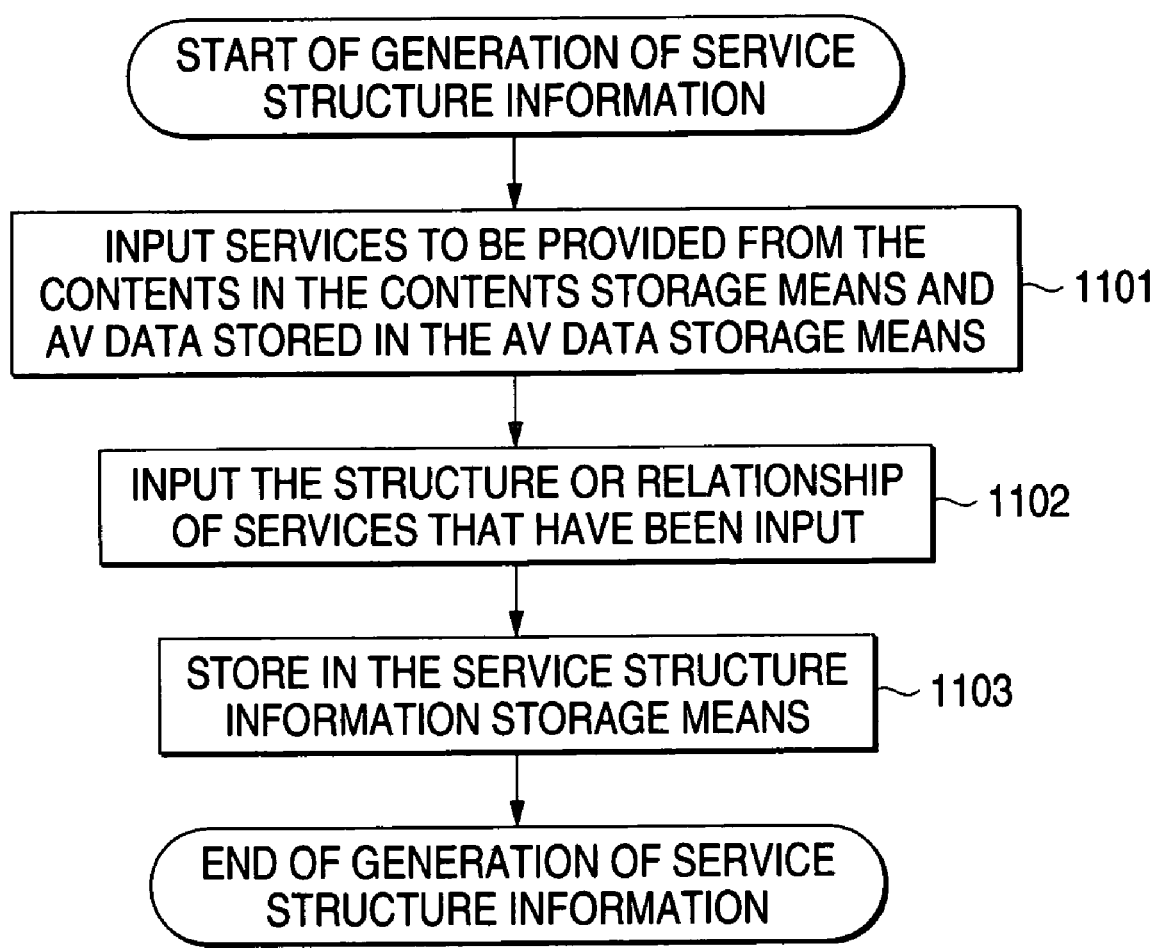
FIG. 3 is a flowchart showing the operation of service structure information generating means of the transmitter according to the first embodiment.

Processing of the service structure information generating means 11 is shown in the flowchart of FIG. 3.

Step 1101: The contents provider inputs information on the services to group data contents stored in the data contents storage means 17 and AV data stored in the AV data storage means 18 to the service structure information generating means.

Step 1102: The contents provider inputs the structure between the services and the type of the service structure information at the same time. The service structure information generating means 11 generates service structure information based on this information.

Step 1103: The service structure information generating means 11 stores the service structure information in the service structure information storage means 15.

Figures 15, 16:
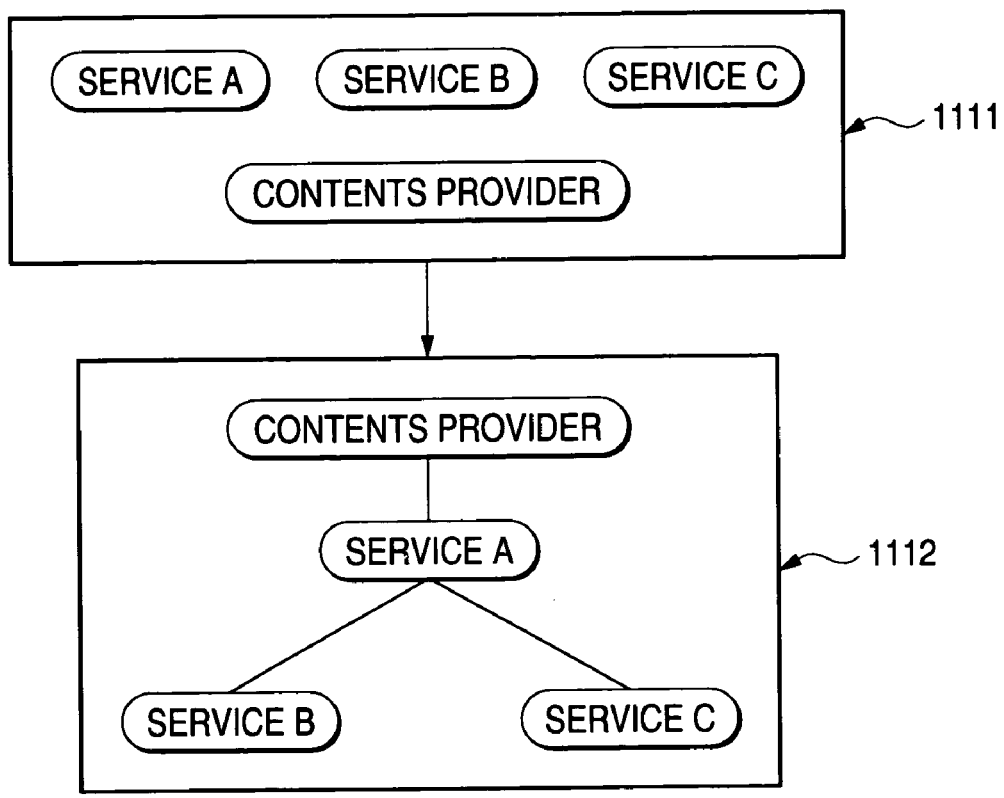
FIG. 15 shows data structure produced by service structure information generating means of the transmitter according to the first embodiment.
FIG. 16 shows service structure information transmitted by the transmitter according to the first embodiment.

Via this step 1101, step 1111 in FIG. 15 is generated. Via the step 1101, step 1112 in FIG. 15 is generated. An example of description of service structure information in step 1112 in FIG. 15 is shown in FIG. 16.

The type to be appended to service structure information is used to identify the application activated in the receiver. A document (script, etc.) describing the processing that can be interpreted by the receiving side may be appended to service structure information as a type itself. Or, the contents of a document (data contents, script, etc.) describing the processing that can be interpreted by the receiving side may be transmitted as data contents and an identifier to identify the document may be appended as a type to the service structure information.

Figure 4:
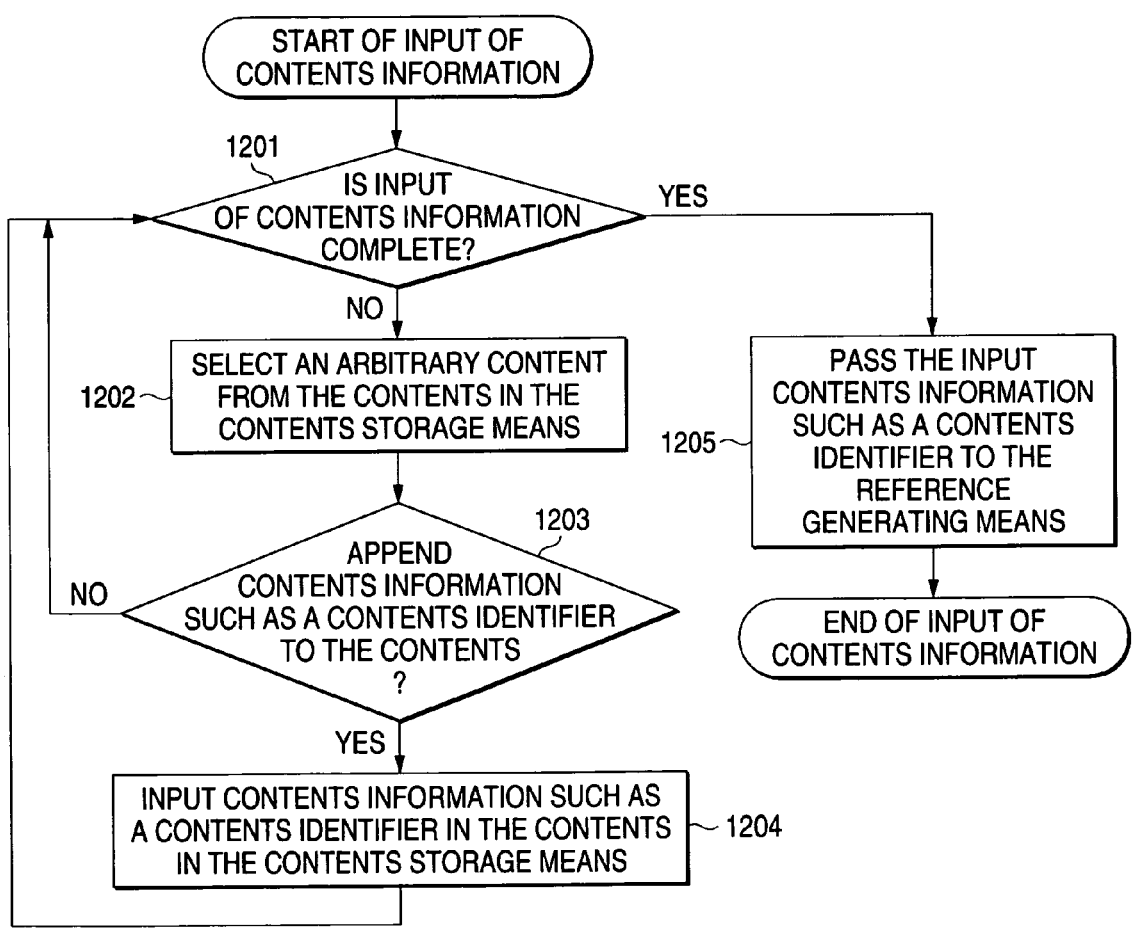
FIG. 4 is a flowchart showing the operation of contents information input means of the transmitter according to the first embodiment.

Next, processing of the contents information input means 12 is shown in the flowchart of FIG. 4.

Step 1201: In case input of contents information is not complete,

Step 1202: The contents information input means 12 selects arbitrary contents from the contents storage means 17, 18.

Step 1203: The contents information input means 12 selects whether to input contents identifiers or information on the contents for the selected contents, and inputs the contents information. The input is made manually or automatically. In case data is input, Step 1204: The contents information input means 12 stores the input contents information in the contents storage means 17, 18 in correspondence with the contents.

Step 1205: When input of contents information is complete, the contents information input means 12 passes the contents identifiers or information on the contents to the reference generating means 13.

Figure 5:
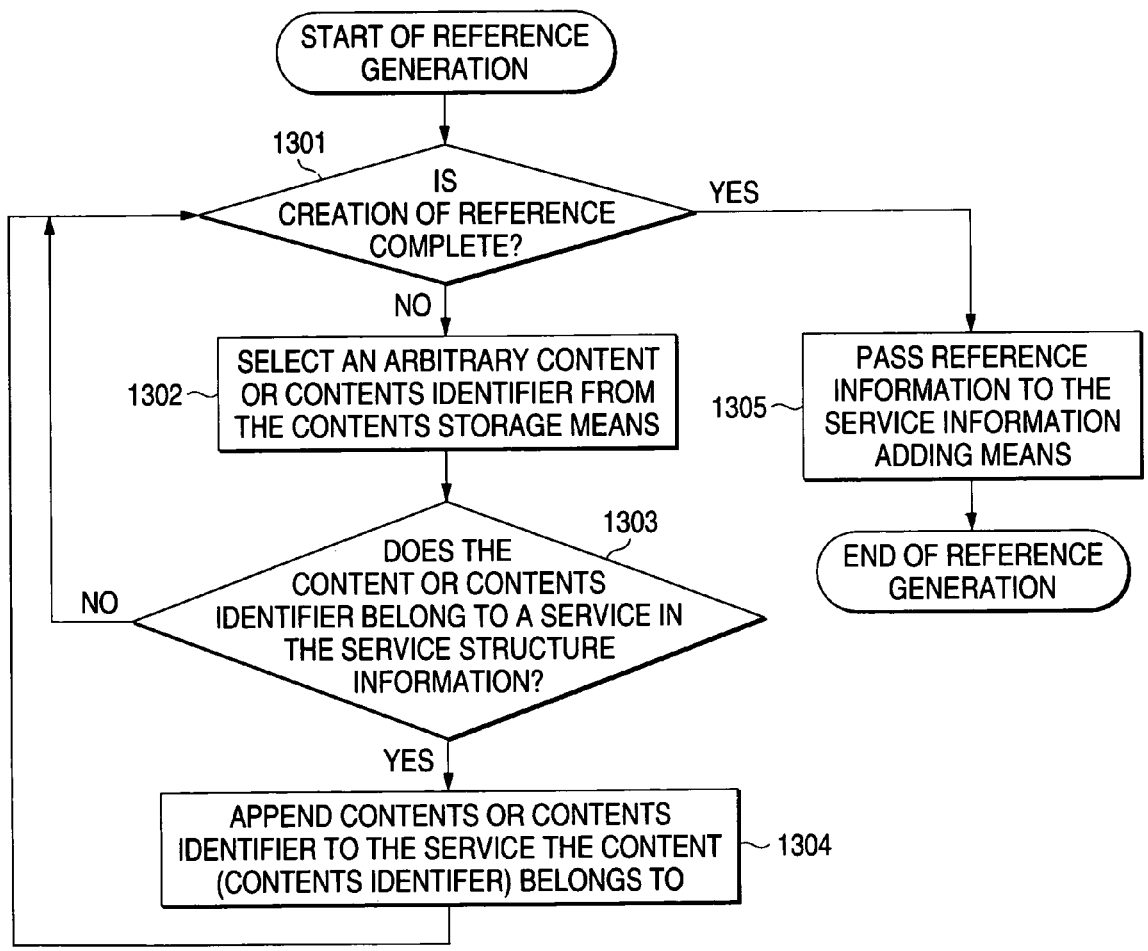
FIG. 5 is a flowchart showing the operation of reference generating means of the transmitter according to the first embodiment.

Next, processing of the reference generating means 13 is shown in the flowchart of FIG. 5.

Step 1301: In case generation of reference information is not complete,

Step 1302: The reference generating means 13 selects an arbitrary contents identifier from among the contents identifiers input from the contents information input means 12.

Step 1303: In case the contents identifier belongs to the service in the service structure information, Step 1304: The reference generating means 13 inputs the contents identifier via manual procedure in the node in the service structure information and generates reference information representing the relationship between the node and the contents identifier.

Step 1305: When generation of the reference information is complete, the reference generating means 13 passes the reference information generated in step 1304 to the service information adding means 14. An example of the reference information is shown in FIG. 14.

Processing in steps 1302 and 1304 may be automatic. In this case, all the contents identifiers may be selected in order in step 1302 and a relationship between the nodes and the contents identifiers in the service structure information may be configured based on the information appended to the contents in advance.

Figure 6:
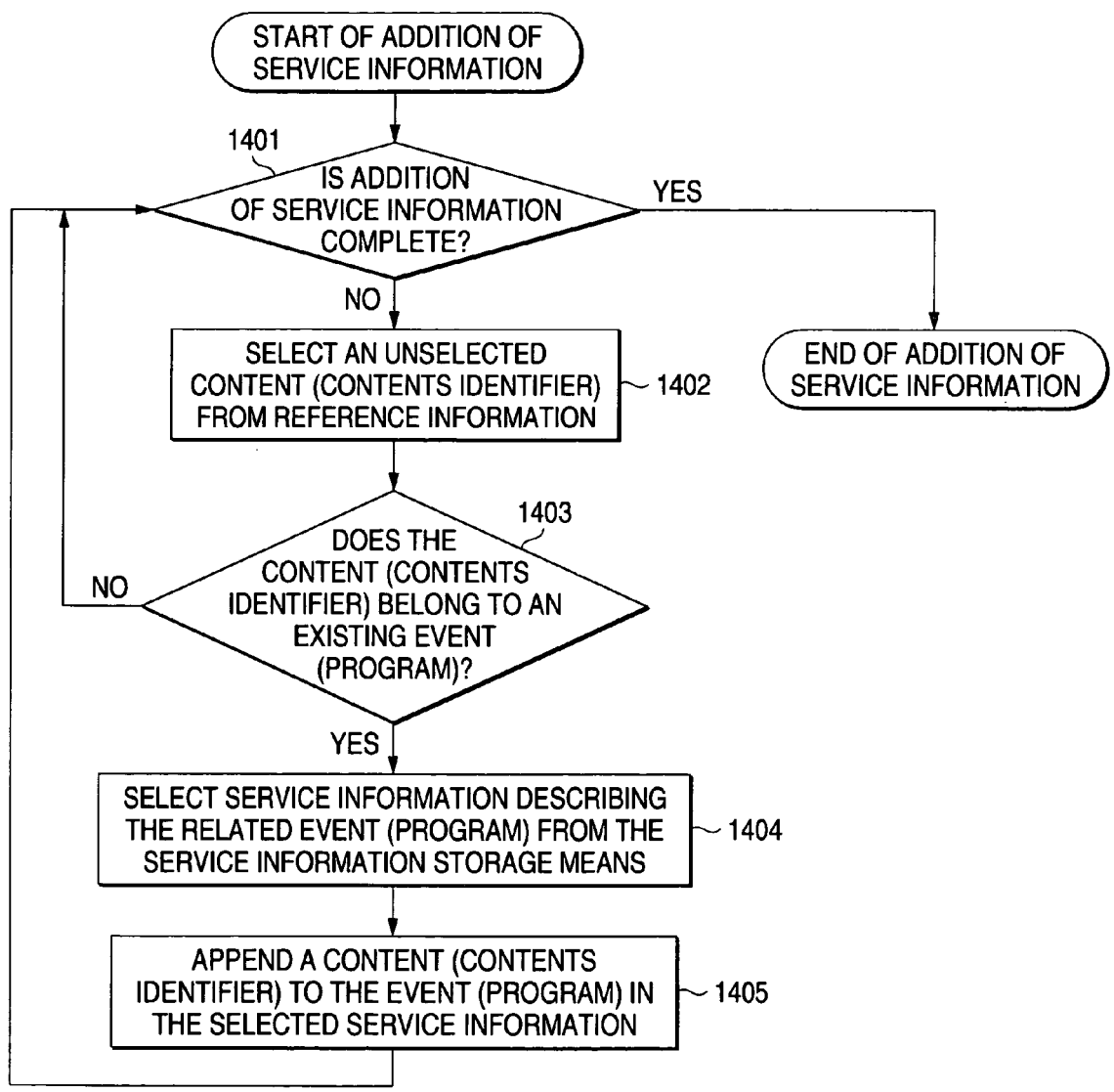
FIG. 6 is a flowchart showing the operation of service information adding means of the transmitter according to the first embodiment.

Next, processing of the service information adding means 14 is shown in the flowchart of FIG. 6.

Step 1401: In case addition of reference information to service information is not complete, Step 1402: The service information adding means 14 selects an unselected contents identifier from the reference information.

Step 1403: The service information adding means 14 identifies whether the contents identifier is related to an existing event (program).

Step 1404: In case the contents identifier is related to an existing event, the service information adding means 14 selects service information where the related event (program) is described from the service information storage means 16.

Step 1405: The service information adding means 14 appends reference information consisting of the contents identifier and node information to the description of the event (program) in the selected service information.

The procedure is repeated until addition of reference information to service information is complete. In this way, the service information adding means 14 creates a set of an arbitrary program and contents related to the program and associates the reference information on the contents with the data describing the information on the program in the service information storage means 16.

Figure 7:
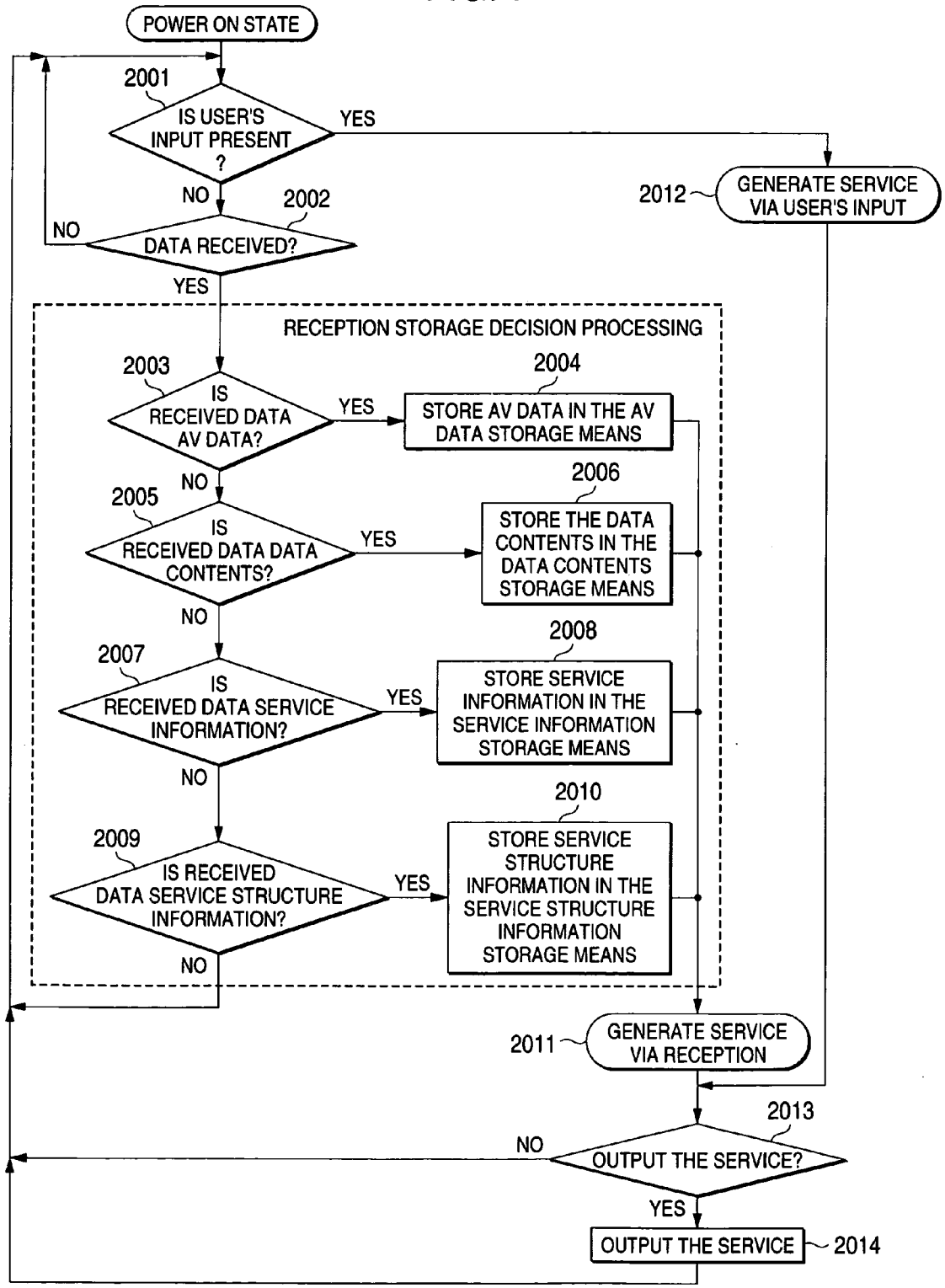
FIG. 7 is a flowchart showing the operation of a receiver according to the first embodiment.

Next, processing of the service receiving means 30 will be described. FIG. 7 shows the processing procedure of the service receiving means 30.

The procedure assumes that the power to the service receiving means 30 is turned ON. In this case, Step 2001: The service receiving means 30 determines whether the user's input has been made on the receiving side.

Step 2002: In case it has not been made, the service receiving means 30 determines whether data has been received from a transmission path. In case data has been received, the service receiving means 30 demultiplexes the received data.

Step 2003: In case received data contains AV data,

Step 2004: The service receiving means 30 stores the AV data in the AV data storage means 39.

Step 2005: In case received data contains data contents,

Step 2006: The service receiving means 30 stores the data contents in the data contents storage means 38.

Step 2007: In case received data contains service information,

Step 2008: The service receiving means 30 stores the service information in the service information storage means 37.

Step 2009: In case received data contains service structure information,

Step 2010: The service receiving means 30 stores the service structure information in the service structure information storage means 36.

Step 2011: The service management mean 40 uses the data stored in steps 2004, 2006, 2008 and 2010 to perform internal processing. Details of the internal processing will be described later.

Step 2012: The service management means 40 performs internal processing in case the user has input data from the user input means 42. Details will be described later.

Step 2013: The service management means 40 determines whether to output the results of the internal processing in steps 2011 and 2012.

Step 2014: The service management means 40 outputs the results of the internal processing from the service output means 41.

The AV data storage means 39 may store AD data in the stream form or convert the AV data to a file format for moving picture files such as MPEG or MOV for storage.

Figure 8:
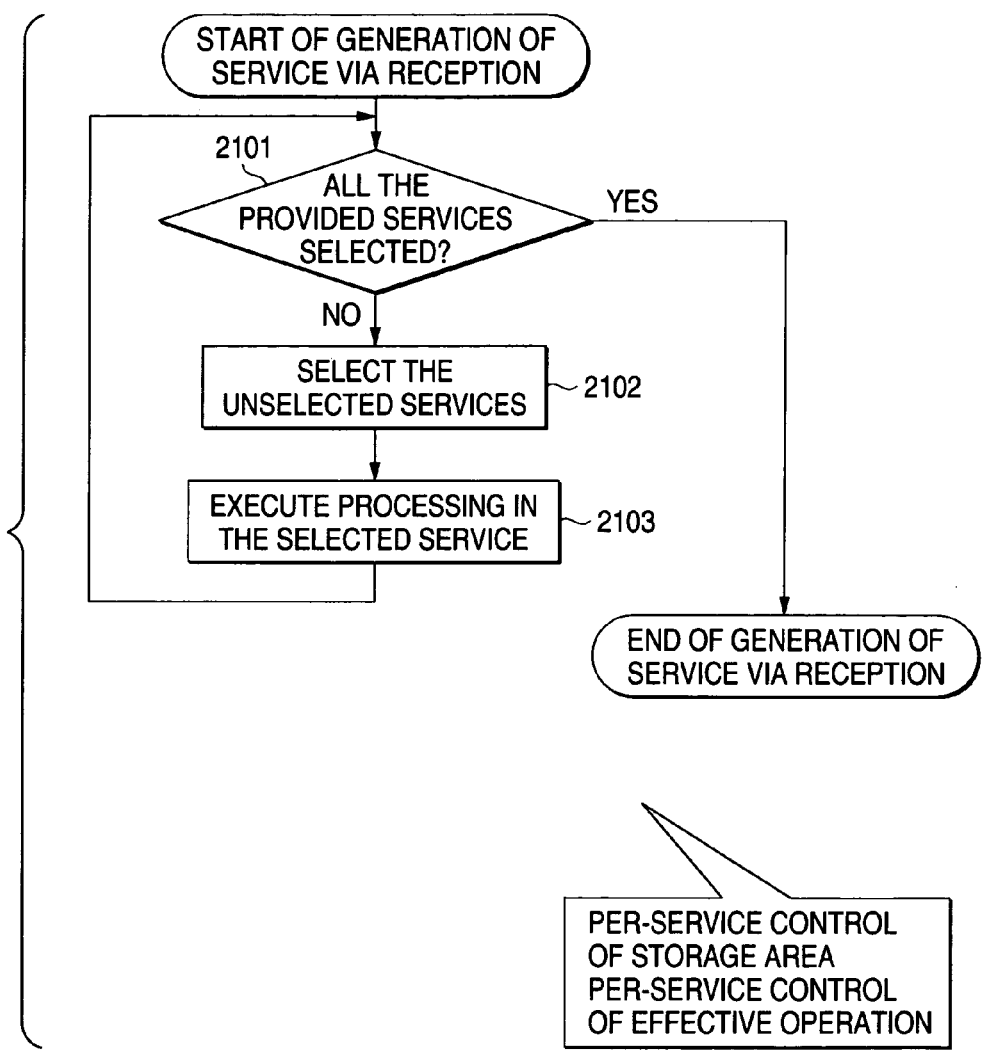
FIG. 8 is a flowchart showing the operation of service creation via reception in the receiver according to the first embodiment.

Next, internal processing via data reception by the service management means 40 in step 2011 is shown in FIG. 8.

Step 2101: In case internal processing for all the types appended to the service structure information stored in the service structure information storage means 36 is not complete, Step 2102: The service management means 40 selects an unselected type.

Step 2103: The service management means 40 executes processing of the application identified by the type.

In this way, the service receiver 30 executes the application identified by the type of service structure information and is terminated when execution of the application is complete.

The service management means 40 has the application for the internal processing installed therein. For example, storage area control is performed to control the area to store data for each node in the received service structure information as the internal processing of the application. In case contents appended to the node cannot be stored in the storage area determined for the node, storage of the contents is restricted or contents validity control is made where a common validity term is determined for the contents appended to the node. A particular example will be given later.

Internal processing that accompanies the user's input is shown in FIG. 8.

Step 2201: When the user selects an arbitrary node (service) in the service structure information from the user input means 42, Step 2202: The service management means 40 activates an application via the input of the user to process the selected service.

In this way, in the broadcast system, the sending side transmits service structure information and service information containing reference information while the receiving side that retains an application to perform per-service processing receives the service structure information and the service information to execute per-service internal processing.

With reference information of the contents stored in the receiver, storing/updating service structure information alone allows the same contents to belong to a different service.

Content-based reference information describes an identifier to identify the service (node) in the service structure information to be referenced by the contents. Thus it is possible to cause the same contents to belong to a difference service (node) by transmitting the service structure information containing modified node description again by using the identifier of the node in the previously transmitted service structure information. For example, assume that Content A references Newspaper A. By transmitting the service structure information constituting Newspaper A where the node of Newspaper A is changed to Newspaper A2, Content 1 belongs to Newspaper A2.

In the second embodiment, internal processing of a receiver assumed in case a viewing contract (subscription) is made per service.

Figure 9:
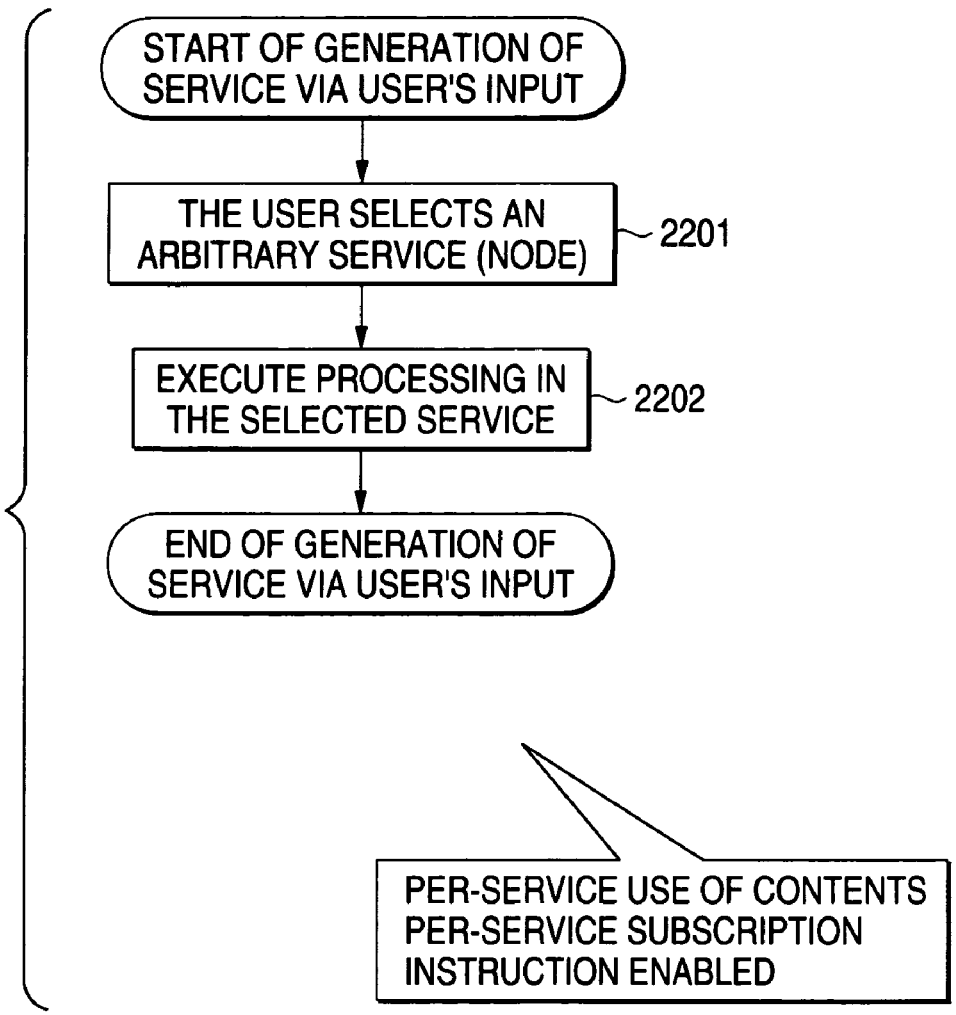
FIG. 9 is a flowchart showing the operation of service generation via user's input in the receiver according to the first embodiment.

When the user has selected an arbitrary node (service) from the user input means 42 of the service receiver 30 to instruct subscription, the service management means 40 activates an application according to the procedure in FIG. 9 and executes the processing in the application to subscribe to the contents that belong to the node.

Figure 17:
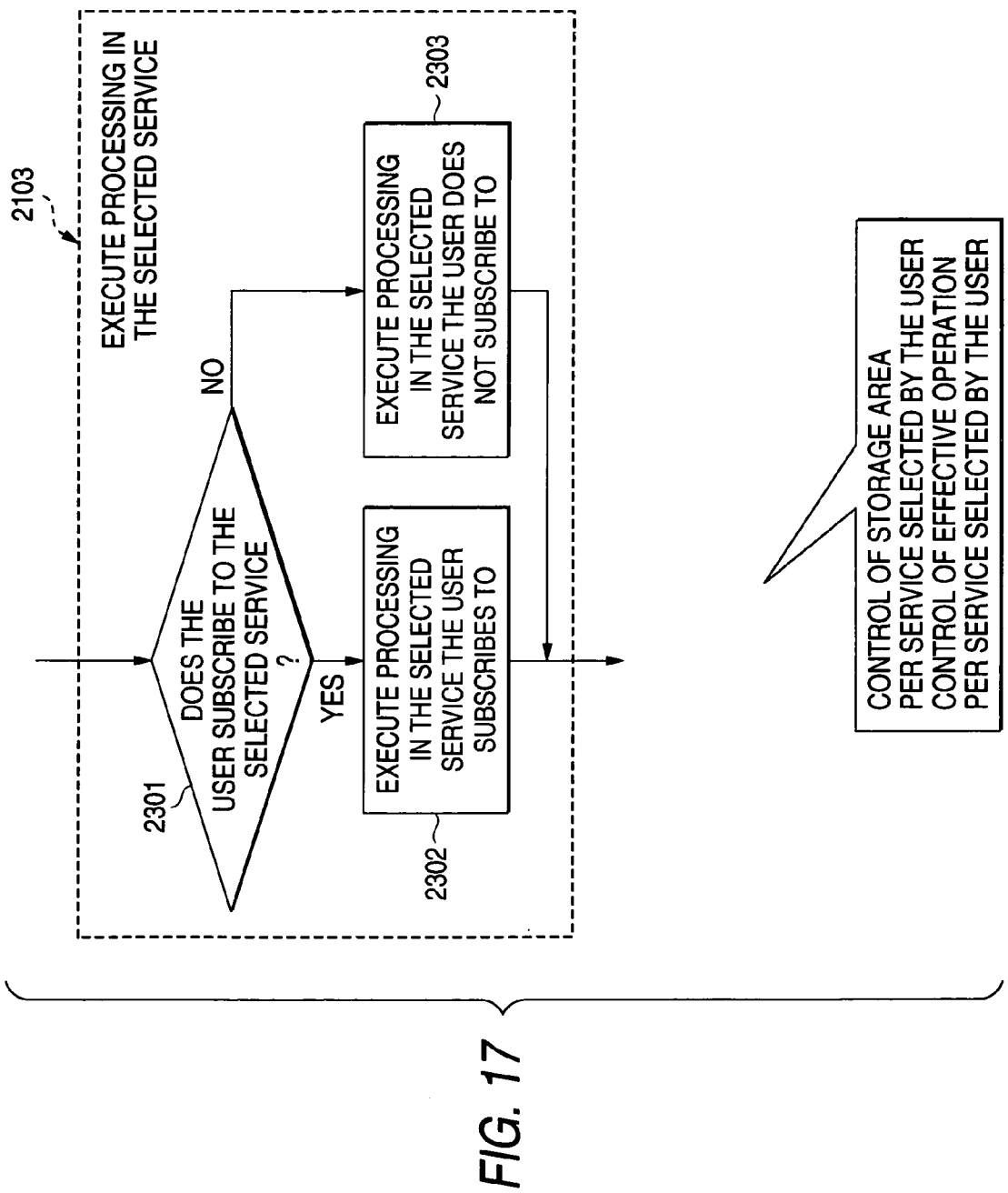
FIG. 17 is a flowchart showing the operation of service generation via reception in the receiver according to a second embodiment.

The service receiver 30 changes the execution of the selected service (step 2103) in the internal processing after data reception (FIG. 8) as shown in FIG. 17.

Step 2301: The service receiver 30 determines whether the service to be internally processed is subscribed to or not.

Step 2302: In case the service is subscribed to, the service receiver 30 performs processing on the service which is subscribed to.

Step 2303: In case the service is not subscribed to, the service receiver 30 performs processing on the service which is not subscribed to.

In case data addition service structure information is stored in the service structure information storage means 36 as shown in FIG. 10 and the user subscribes to Service A, the processing in step 2302 is performed on AV Content 1, Data Content 1 and Data Content 2, and the processing in step 2303 is performed on the remaining data contents and AV contents.

In this way, a receiver in this broadcast system can select services to be subscribed to per node in the received service structure information. Also it is possible to switch internal processing per node.

In the third embodiment, a broadcast system where the contents automatically stored on the receiving side can be controlled on the sending side is described.

A service transmitter in the broadcast system has the same configuration as the service transmitter in FIG. 1. Information indicating whether to automatically store the contents received on the receiving side (automatic storage flag) is input from the contents information input means 12 of the service transmitter 10 (step 1204 in FIG. 4). The automatic storage flag is appended to the contents of service information containing reference information via the service information adding means 14 (step 1405 in FIG. 6). FIG. 20 illustrates service information with the automatic storage flag appended.

Meanwhile, a service receiver in the third embodiment comprises an automatic storage management means 43 for controlling the data contents receiving means 34 and the AV data receiving means 35 based on the automatic storage flag appended to the service information. The other configuration is the same as that of the service receiver in the first embodiment (FIG. 1).

Figure 19:
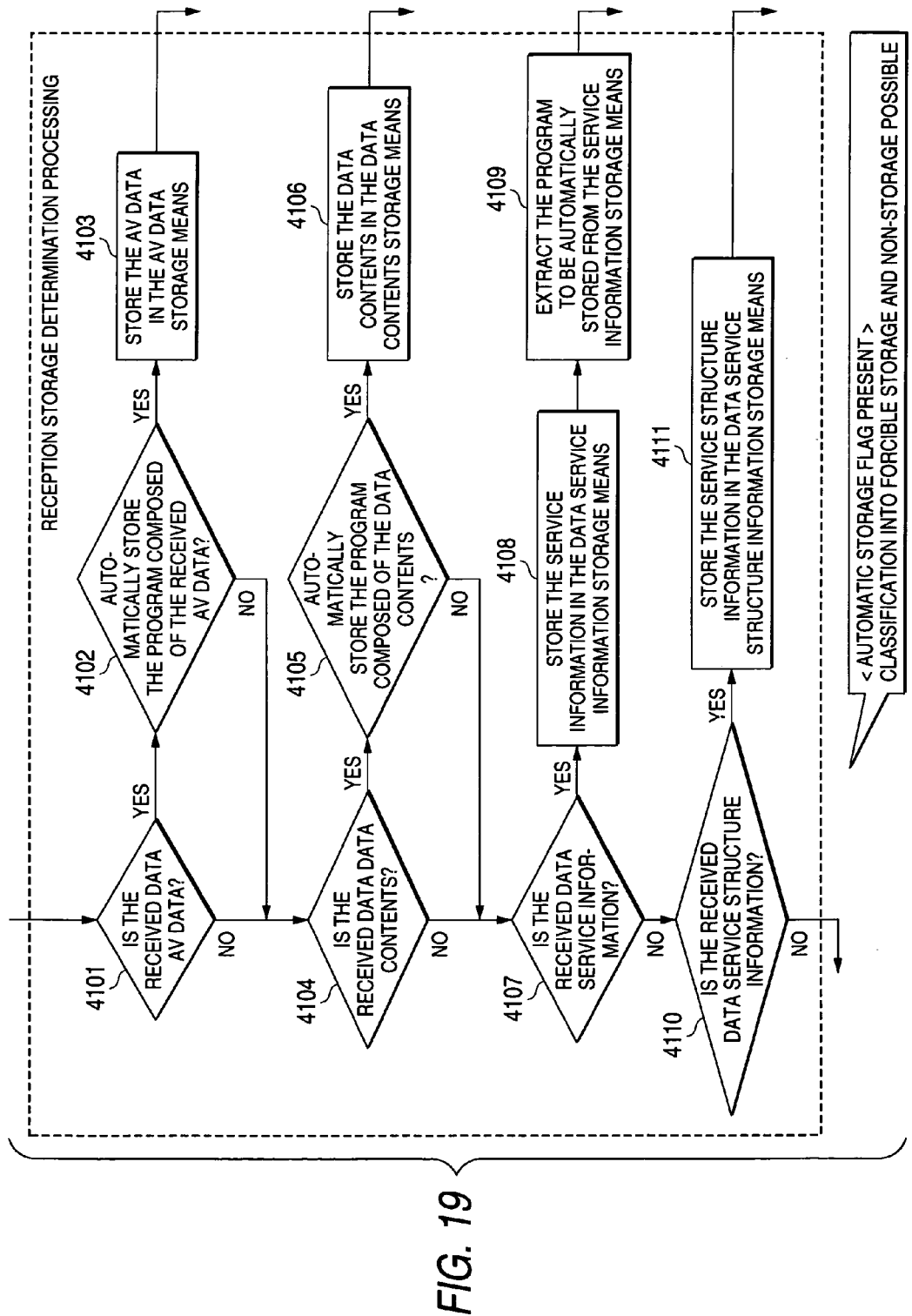
FIG. 19 is a flowchart showing the operation of a receiver according to the third embodiment.

FIG. 19 is a flowchart showing the operation of the receiver and corresponds to the processing procedure from step 2003 to step 2010 in FIG. 7.

On receiving data, the receiving/demultiplexing means 31 demultiplexes the received data.

Step 4101: In case the received data contains AV data,

Step 4102: The automatic storage management means 43 determines whether the program composed of the received AV data is a candidate for automatic storage from the service information that has been received.

Step 4103: In case the program is a candidate for automatic storage, the automatic storage management means 43 stores the AV data in the AV data storage means 39.

Step 4104: In case the received data contains data contents,

Step 4105: The automatic storage management means 43 determines whether the program composed of the received data contents is a candidate for automatic storage from the service information.

Step 4106: In case the program is a candidate for automatic storage, the automatic storage management means 43 stores the data contents in the data contents storage means 38.

Step 4107: In case the received data contains service information,

Step 4108: The automatic storage management means 43 stores the service information in the service information storage means 38.

Step 4109: The automatic storage management means 43 extracts a program to be automatically stored from the service information storage means 37.

Step 4110: In case the received data contains service structure information, Step 4111: The automatic storage management means 43 stores the service structure information in the service structure information storage means 36.

AV data stored in step 4103, data contents stored in step 4106, service information stored in step 4109, and service structure information stored in step 4111 are output to the service management means 40 and internal processing is performed following the same procedure as in FIG. 7.

In case it can be determined that contents to be automatically stored is present from the service information that has been received, the time the contents are transmitted may be reserved via timer setting and the contents alone may be received and stored automatically.

Figure 21:
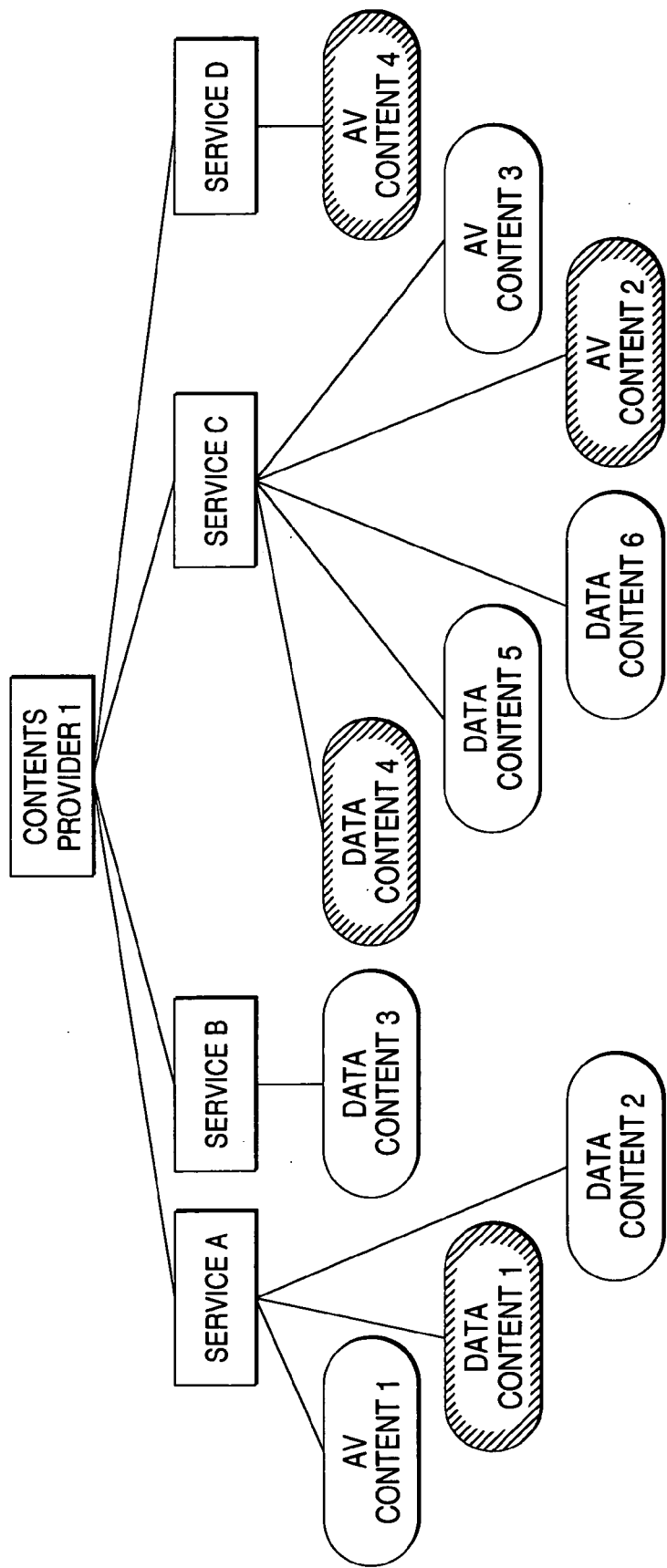
FIG. 21 shows data addition service structure information with the automatic storage flag appended according to the third embodiment.

For example, in case the service transmitter assumes data addition service structure information as shown in FIG. 21, it transmits service structure information data shown in FIG. 13 and service information data shown in FIG. 20.

Meanwhile, assume that the receiving side that has received data addition service structure information in FIG. 21 has received Data Contents 1 through 6 and AV Contents 1 through 4. In case the receiving side does not store data received as default data (except cache data) but automatically stores contents with the automatic storage flag alone, the receiving side automatically receives Data Contents 1, 4 and AV Contents 2, 4 having the automatic storage flags.

Operation of automatic storage greatly depends on the application on the receiving side. For a receiving side that assumes storage of all the received data, contents and AV data having the flag may be automatically excluded from storage processing.

In the automatic storage of contents, update of storage is performed in case the contents identifier is identical with the contents that have been stored. In the update of storage, basically the overwrite update is performed. In case the contents are managed by version, all the contents of different versions may be stored even when they have the same contents identifier.

In this way, the sending side individually appends the flag to contents so that the receiving side automatically stores contents independently of the service structure information.

It is also possible to enable automatic storage of a particular node in the service structure information on the sending side and make the receiving side automatically store the contents that belong to the node.

By specifying a node in the service structure information and contents that belong to the node, it is possible to separate the operation on the receiving side on the contents of the same node based on the type of contents. For example, in case setting is made to automatically store Service A in the service structure information in FIG. 21, Data Content 1 that belongs to Service A is automatically stored but AV Content 1 and Data Content 2 are not automatically stored. In this way, it is possible to cause the receiving side to take action at two levels ("automatic storage" and "non-automatic storage" and so on) for the contents that depend on a node in the service structure information.

For example, setting is possible where Service A in the service structure information in FIG. 21 is automatically stored and the service structure information is transmitted to the receiver of User A while Service C in the service structure information in FIG. 21 is automatically stored for User B. In this case, by transmitting the service structure information to the receiver of User B, it is possible to automatically store Data Content 1 in the receiver of User A and to automatically store Data Content 4 and AV Content 2 in the receiver of User B.

To transmit different service structure information per user, receiving contract information and individual messages to receiving subscribers may be transmitted in the EMM (Entitlement Management Massage), a data format used to transmit data via broadcasts.

In the fourth embodiment, the case is described where the contents of a service subscribed to by the receiving side are a sole candidate for automatic storage.

Figure 18:
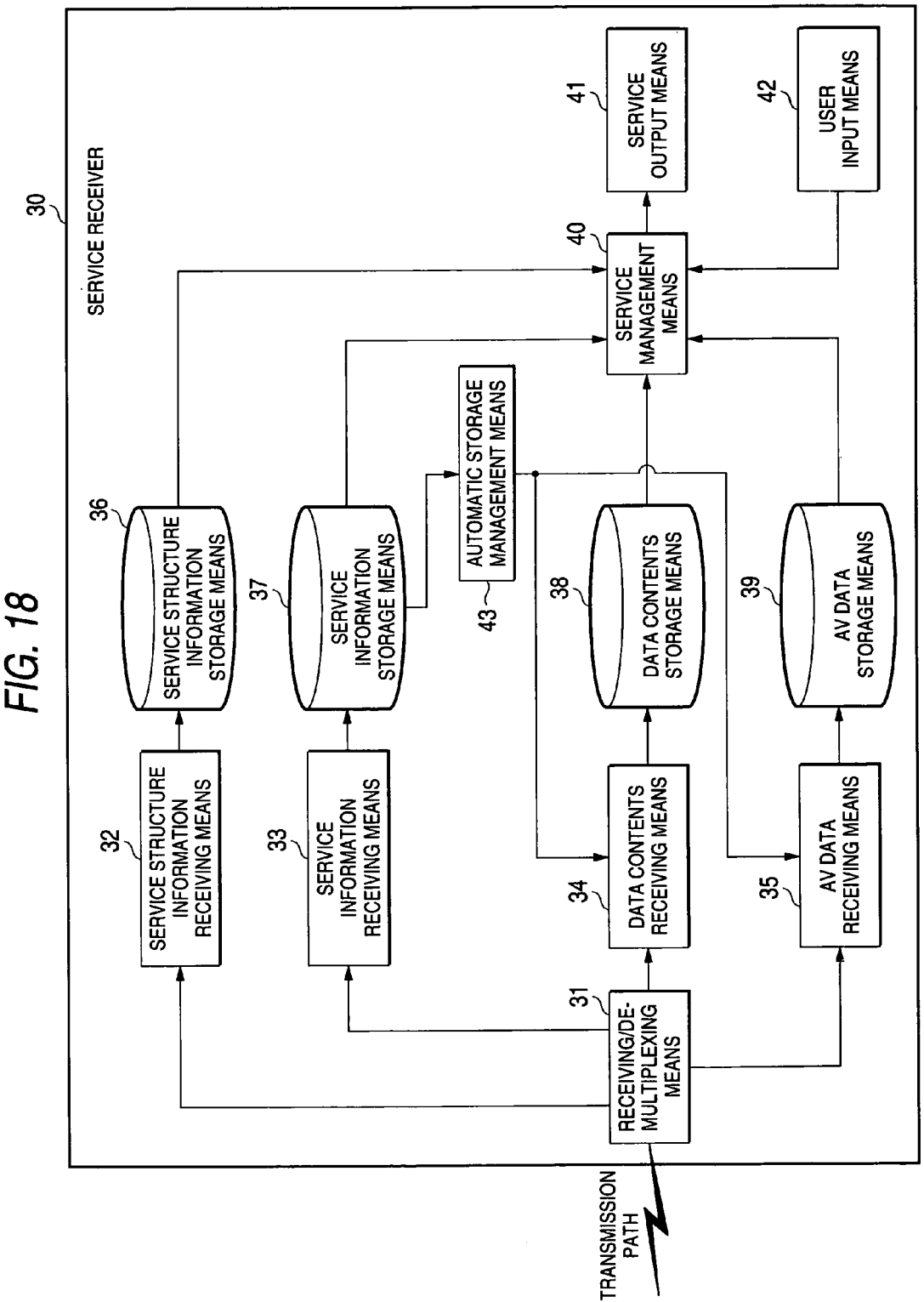
FIG. 18 is a block diagram showing the configuration of a receiver according to a third embodiment of the invention.
Figure 22:
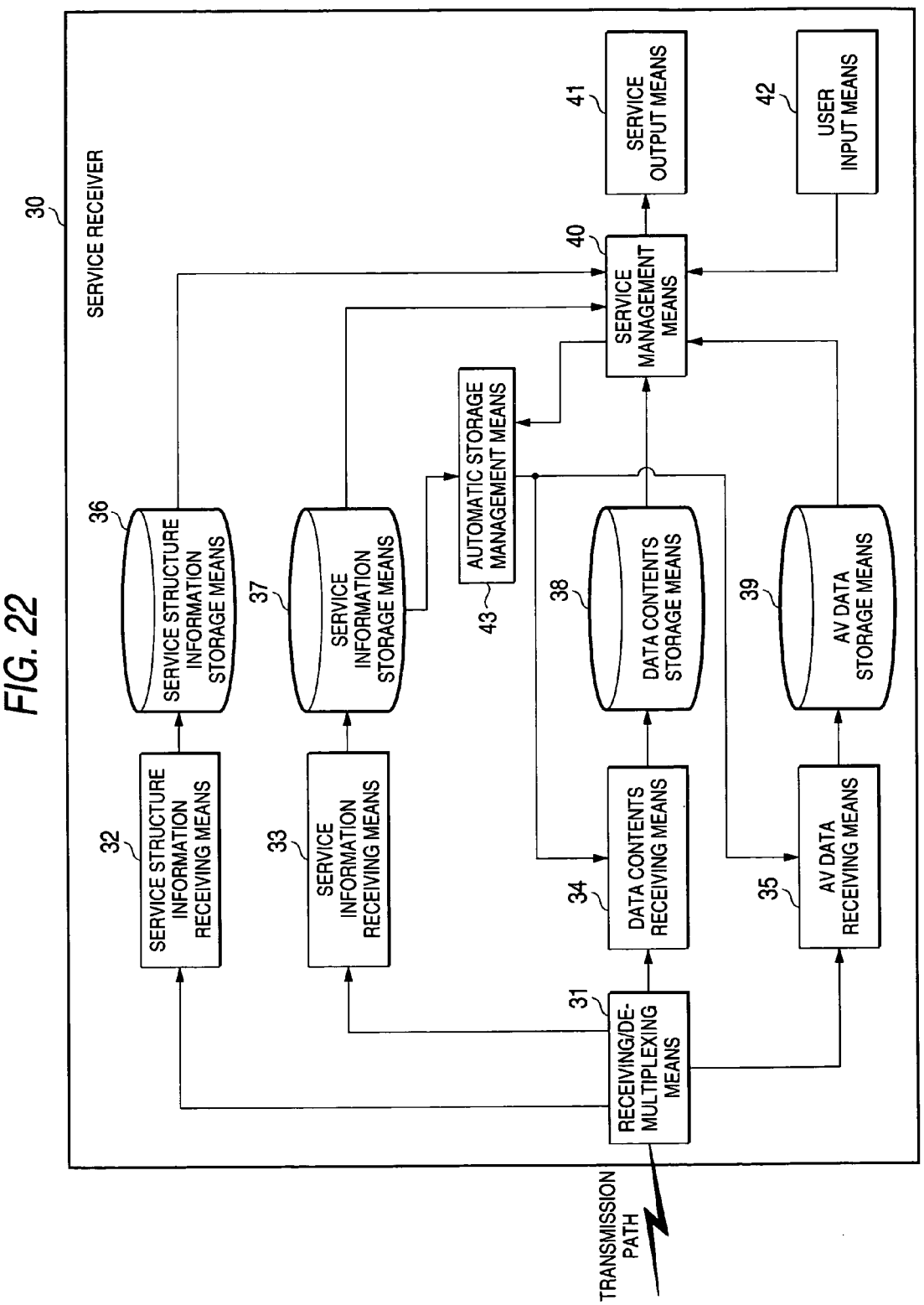
FIG. 22 is a block diagram showing the configuration of a receiver according to a fourth embodiment of the invention.

A service receiver in the broadcast system differs from the third embodiment (FIG. 18) in that the information on a service that is subscribed to is transmitted from the service management means 40 to the automatic storage management means 43 as shown in FIG. 22.

Figure 23:
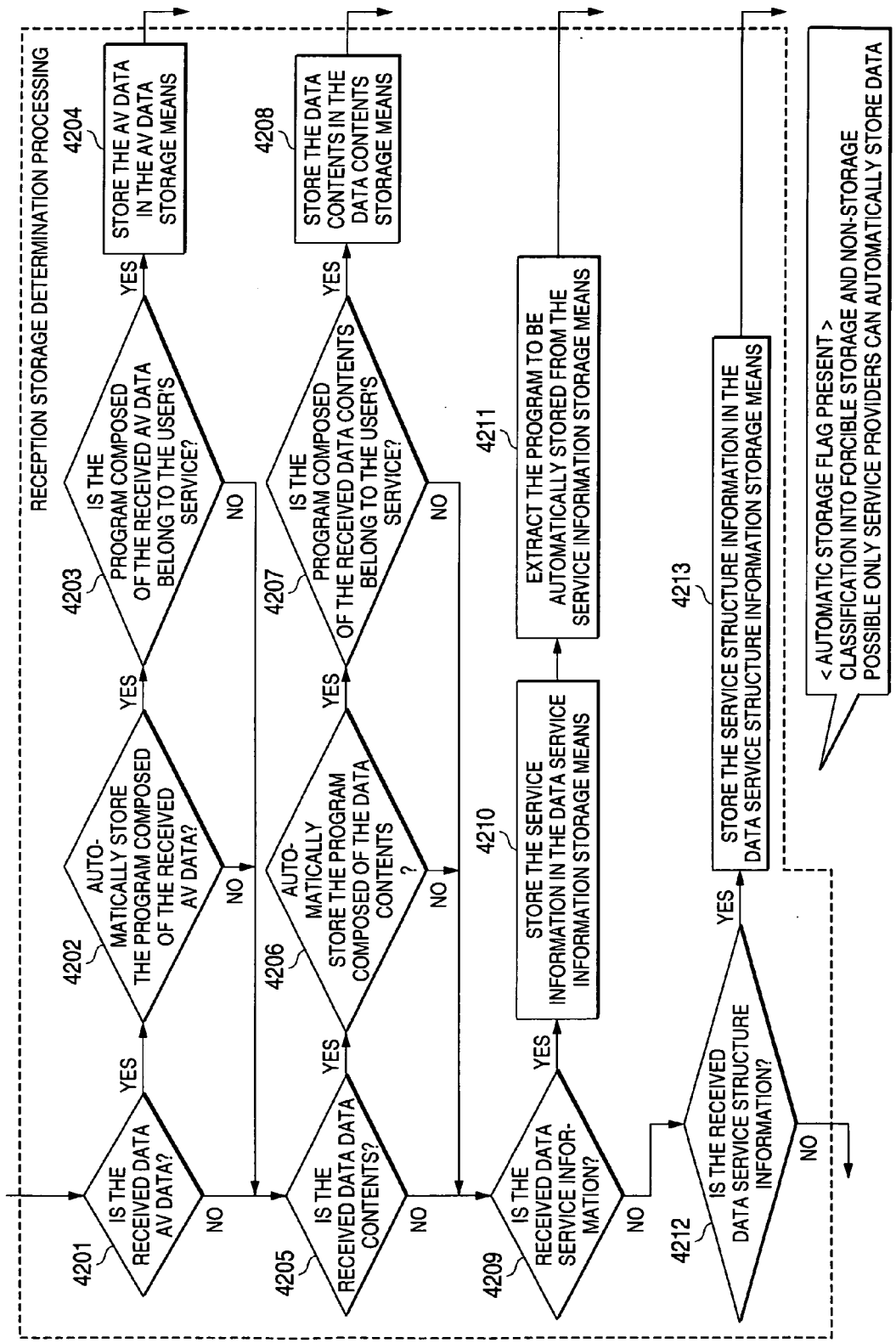
FIG. 23 is a flowchart showing the operation of a receiver according to the fourth embodiment.

FIG. 23 is a flowchart showing the operation of the receiver and corresponds to the processing procedure from step 2003 to step 2010 in FIG. 7.

On receiving data, the receiving/demultiplexing means 31 demultiplexes the received data.

Step 4201: In case the received data contains AV data,

Step 4202: The automatic storage management means 43 determines whether the program composed of the received AV data is a candidate for automatic storage from the service information that has been received.

Step 4203: In case the program is a candidate for automatic storage, the automatic storage management means 43 determines whether the program composed of the received AV data belongs to a service the user subscribes to.

Step 4204: In case the program belongs to a service the user subscribes to, the automatic storage management means 43 stores the AV data in the AV data storage means 39.

Step 4205: In case the received data contains data contents,

Step 4206: The automatic storage management means 43 determines whether the program composed of the received data contents is a candidate for automatic storage from the service information.

Step 4207: In case the program is a candidate for automatic storage, the automatic storage management means 43 determines whether the program composed of the received AV data belongs to a service the user subscribes to.

Step 4208: In case the program belongs to a service the user subscribes to, the automatic storage management means 43 stores the data contents in the data contents storage means 38.

Step 4209: In case the received data contains service information,

Step 4210: The automatic storage management means 43 stores the service information in the service information storage means 37.

Step 4211: The automatic storage management means 43 extracts a program to be automatically stored from the service information storage means 37.

Step 4212: In case the received data contains service structure information,

Step 4213: The automatic storage management means 43 stores the service structure information in the service structure information storage means 36.

AV data stored in step 4204, data contents stored in step 4208, service information stored in step 4211, and service structure information stored in step 4213 are output to the service management means 40 and internal processing is performed following the same procedure as in FIG. 7.

In case it can be determined that contents to be automatically stored is present from the service information that has been received and that the contents is subscribed to by the user, the time the contents are transmitted may be reserved via timer setting and the contents alone may be received and stored automatically.

For example, in case the service transmitter assumes data addition service structure information as shown in FIG. 21, it transmits service structure information data shown in FIG. 13 and service information data shown in FIG. 20.

Figure 24:
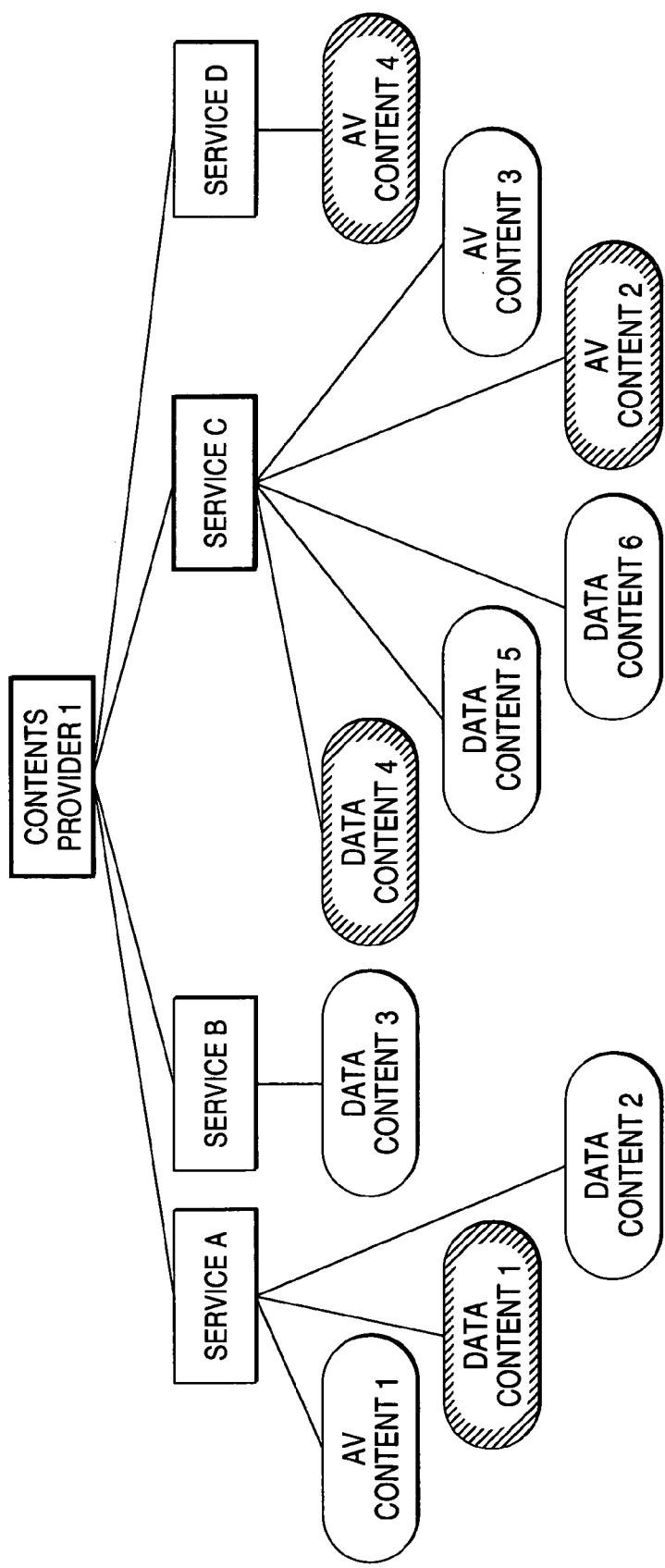
FIG. 24 shows data addition service structure information received by the receiver according to the fourth embodiment.

Meanwhile, assume that the user has selected (subscribed to) Service C provided by Contents Provider 1 on the receiving side that has received data addition service structure information in FIG. 21. The data addition service structure information in this case is shown in FIG. 24. Bold lines show the services the user subscribes to and the cross-hatched section the data with the automatic storage flag appended.

Assume that Data Contents 1 through 6 and AV Contents 1 through 4 are received on the receiving side. In case the receiving side does not store data received as default data (except cache data) but automatically stores contents with the automatic storage flag alone, the receiving side automatically receives Content 4 and AV Data 2 that belong to Service C.

Figure 25:
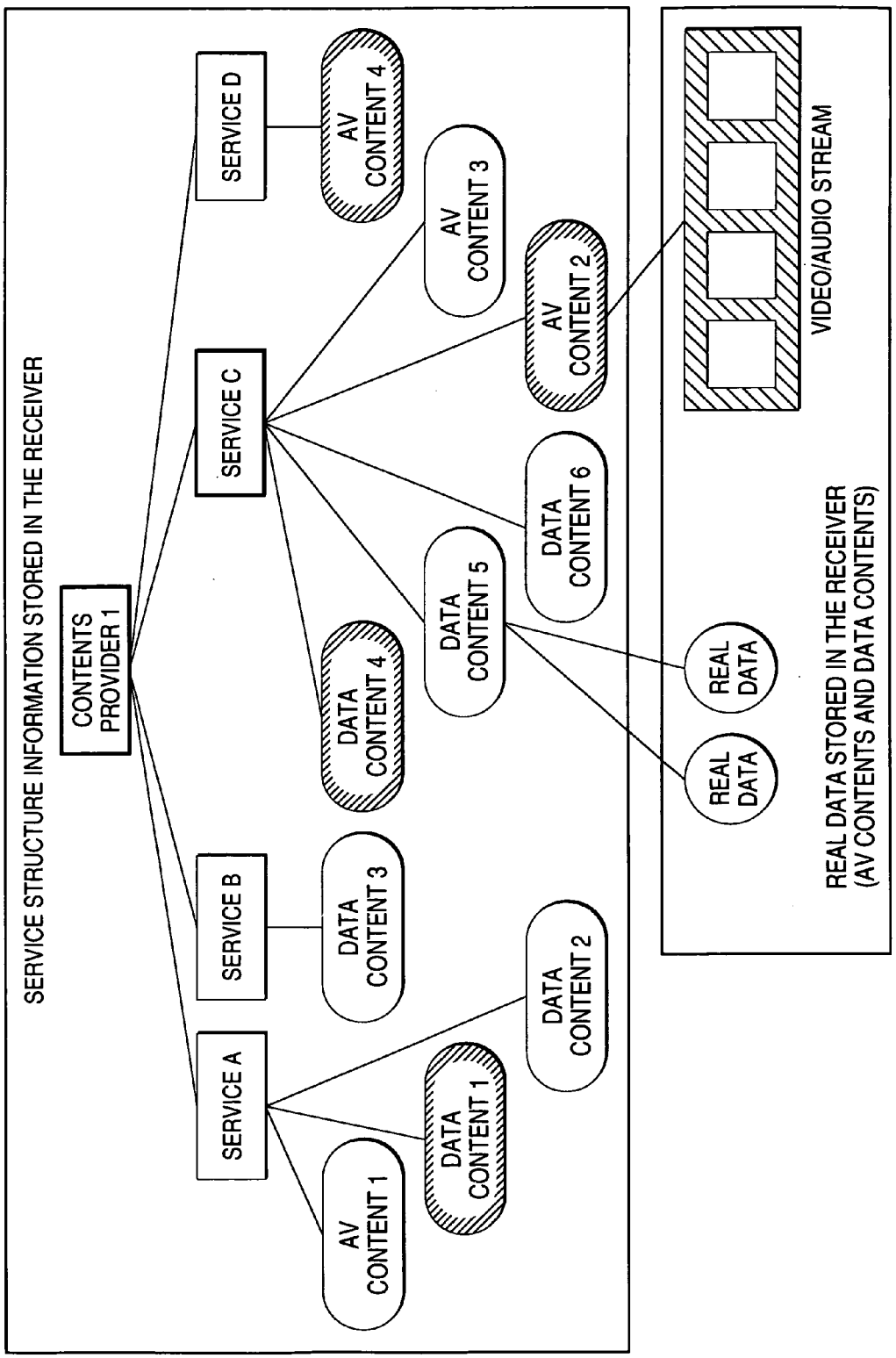
FIG. 25 shows data addition service structure information received by the receiver according to the fourth embodiment and stored real data.

In doing so, it is possible to store real data of Content 4 and AV Data 2 that belong to Service C from Contents Provider 1 as shown in FIG. 25.

Operation of automatic storage greatly depends on the application on the receiving side. For a receiving side that assumes storage of all the received data, contents and AV data that belong elsewhere than the selected Service C may be automatically excluded from storage processing.

In the fifth embodiment, some of the forms of services provided by a broadcast system according to the invention will be described.

Figure 26:
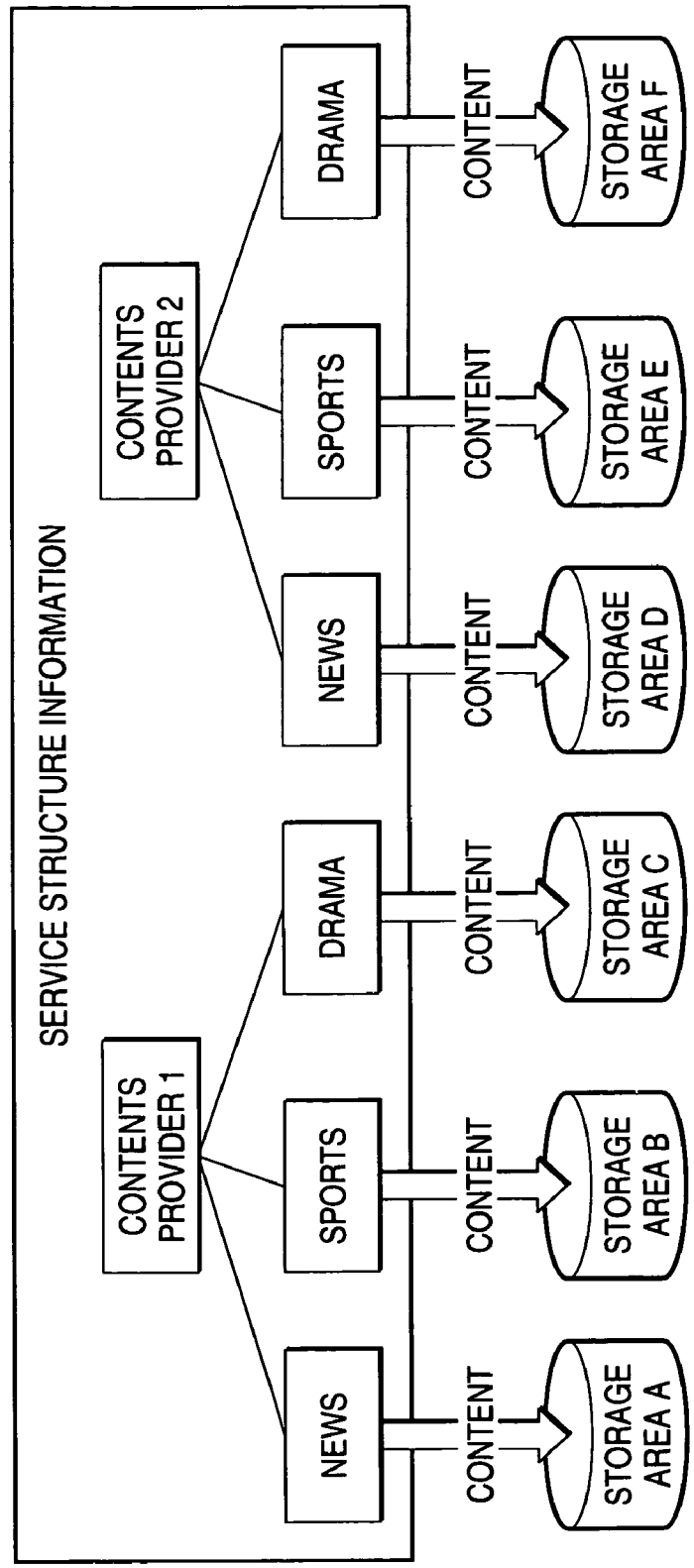
FIG. 26 shows service structure information for exclusive storage area management according to a fifth embodiment of the invention.

FIG. 26 shows a case where the contents storage area on the receiving side is exclusively managed per node (News, Sports, Drama) in the service structure information. Exclusive management of the storage area means management of each area in an independent way without invading the storage area of each other.

In this case, the sending side transmits:

(1) Service structure information shown in FIG. 26 and (2) Service information storing reference information and contents information. The receiving side receives data (1) and (2) then executes an application to exclusively manage the storage area per node in the service structure information based on the received data.

Via this, contents that belong to respective services of contents providers are stored in specified storage areas and the same contents are updated, for example, contents that belong to Service "News" provided by Contents Provider 1 are stored in Storage Area A and contents that belong to Service "Sports" in Storage Area B.

Thus, it is possible to prevent all the stored data from being the News contents or Sports contents. Respective storage areas are not invaded by other contents providers either.

Figure 27:
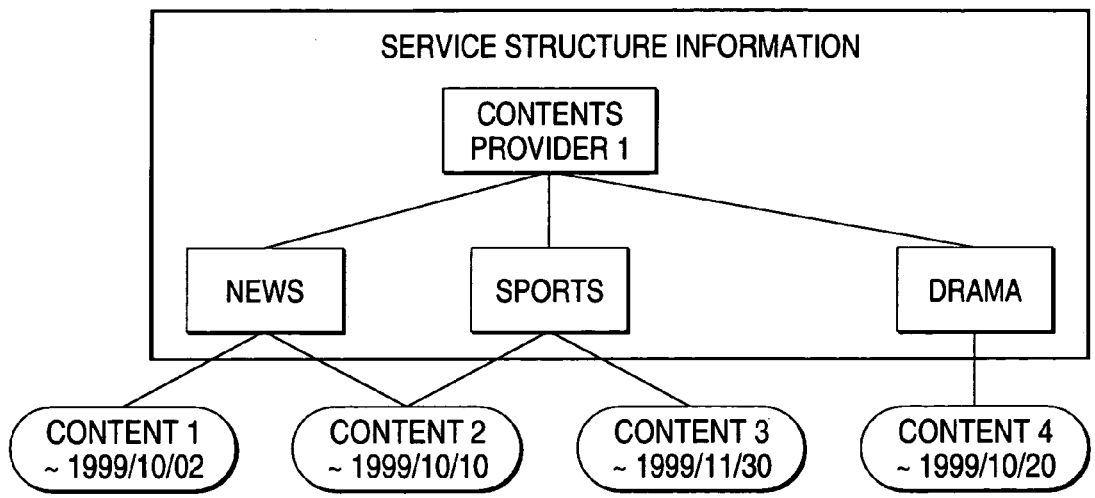
FIG. 27 shows service structure information for validity term management according to a fifth embodiment.

FIG. 27 shows the processing to specify the same validity term of contents in a group by activating an application for managing the validity term of contents based on the information on the validity term described in the contents in case such an application is owned by the receiving side.

Contents in data addition service structure information shown in FIG. 27 have respective validity terms. Content 2 belongs to Node "News" as well as Node "Sports."

In this case, the sending side sending side transmits:

(1) Service structure information shown in FIG. 27

(2) Service information storing reference information and contents information. The receiving side receives data (1) and (2) then executes an application to exclusively manage the storage area per node in the service structure information based on the received data.

The receiving side that owns this application can manage contents related to "News" based on the validity term of Content 1. That is, the validity term of Content 2 is originally Oct. 10, 1999 while it may be changed to Oct. 2, 1999 in a group called "News."

In doing so, in case contents that reference each other via a link provided between Content 1 and Content 2 are mutually essential, these contents may be grouped as contents having the same validity term related to "News." The validity term of Content 1 may be set to Oct. 10, 1999 in conformity with the validity term of Content 2.

Similarly, in case Content 2 and Contents 3 as contents related to "Sports" are mutually essential, the validity term of Content 1 and Content 3 may be set to Oct. 10, 1999 in conformity with the validity term of Content 2. The validity term may be changed depending on which of "News" or "Sports" Content 2 belongs to.

Thus, in case the validity term of a group that accommodates contents is given priority rather than the validity term of the contents, the validity term management method is applicable.

In this way, when the validity term of contents are determined, it is not necessary to append a validity term to a node in the service structure information.

Figure 28:
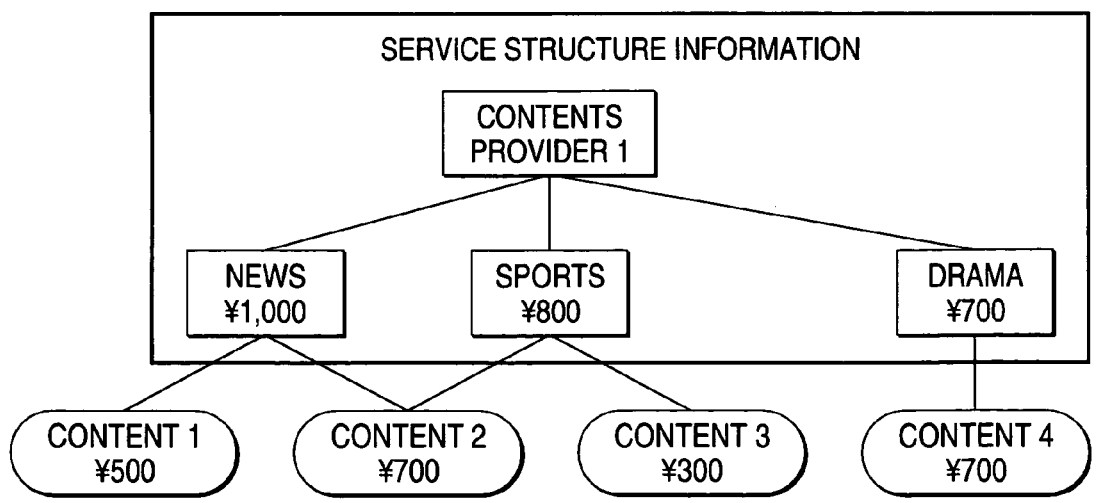
FIG. 28 shows service structure information for stored charging management according to a fifth embodiment.

FIG. 28 shows a case where the receiving side owns an application to calculate the price of a node (service) from the price of contents and calculates the price of a service from the price of contents.

In this case, the sending side transmits:

(1) Service structure information shown in FIG. 28 (excluding the information on the piece of service) and (2) Service information storing reference information and contents information (contents information includes the information on the price). The receiving side receives data (1) and (2) then executes an application to calculate the price of a node (service) from the price of contents.

In this way, by providing an application to calculate the value of News from the values of Content 1 and Content 2, it is not necessary to describe the value of each node in the service structure information. In case contents that belong to News have increased in number, only the additional contents have to be transmitted without a need to modify the service structure information itself, thus upgrading the transmission efficiency.

Figure 29:
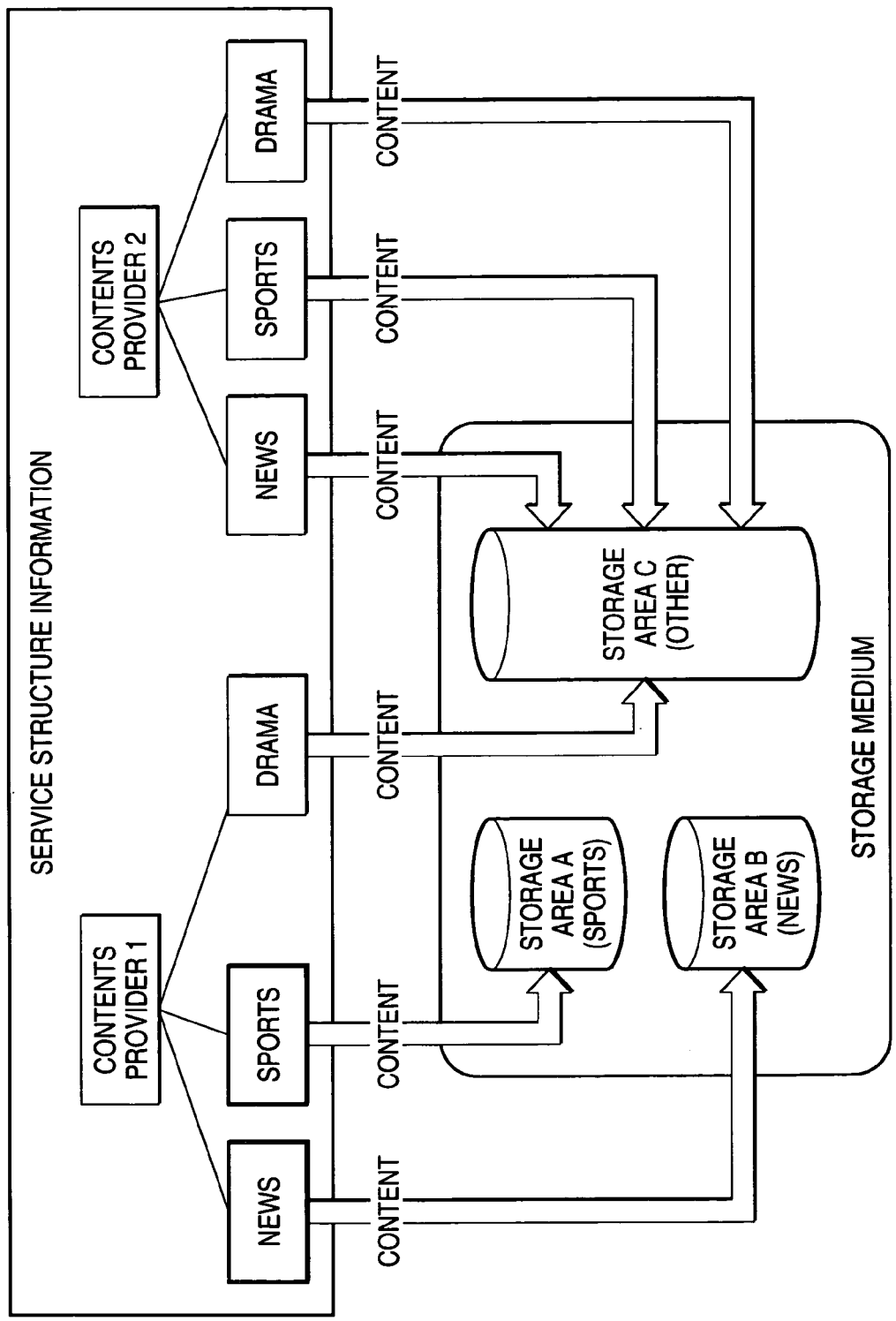
FIG. 29 shows service structure information for exclusive storage area management via node specification according to the fifth embodiment of the invention.

FIG. 29 shows a case where the receiving side owns an application to exclusively manage the storage area per node in the service structure information and the sending side specifies a service (News, Sports) to be managed exclusively.

In this case, the sending side transmits:

(1) Service structure information shown in FIG. 29 and (2) Service information storing reference information and contents information. The sending side incorporates the information to specify a particular node (News, Sports) in the service structure information being transmitted. The receiving side receives data (1) and (2) then executes an application to exclusively manage the storage area per node in the service structure information based on the received data.

The following describes a case where the sending side knows the information to identify the storage area from each node in the service structure information in advance and directly specifies the storage area of the receiving side by using the information.

The receiving side, based on the information from the sending side, stores contents that belong to News and Sports of Contents Provider 1 in Storage Area A and Storage Area B respectively, as shown in FIG. 29. The receiving side stores the remaining contents in Storage Area C. The receiving side updates the same contents already in a storage area.

Thus, it is possible for the sending side to specify the storage area on the receiving side per group. This allows the sending side to transmit contents according to the capacity of the specified storage area.

For correspondence between each node in the service structure information and a storage area, it is possible to describe on the node the capacity of a storage area for storing the contents that belong to the node. Storage areas may be separate between contents providers.

In case the receiving side owns an application to manage the validity term of contents per service in FIG. 27, the sending side transmits:

(1) Service structure information shown in FIG. 27 (validity term is set as an attribute of the element or node) and (2) Service information storing reference information and contents information. The transmitting side incorporates the information to specify a particular node (News) in the service structure information being transmitted so that the receiving side can manage the validity term of contents per node in the received service structure information.

The validity term specified per contents is neglected. For example, in case the information "valid until Dec. 1, 1999" is set as an attribute of News in the service structure information in FIG. 27, the validity term of Content 1 and Content 2 will be Dec. 1, 1999.

In this case, it is not necessary to describe a validity term per contents but to describe a validity term in the service structure information for grouping the contents. This reduces the volume of description thus upgrading the transmission efficiency.

Information may be appended to a node in the service structure information in order to "enable the contents until the storage area is full" as a validity term of contents that belong to the node in the service structure information and the receiving side may install a corresponding application.

In FIG. 29, the receiving side can own an application to exclusively manage the storage area per node in the service structure information and the receiving side can specify a node (News, Sports) to exclusively manage the storage area so that the contents that belong to the node can be stored in a particular storage area in the receiver.

In this case, the sending side transmits:

(1) Service structure information shown in FIG. 29 and (2) Service information storing reference information and contents information). The receiving side specifies a particular node in the service structure information and executes the aforementioned application to store the contents that belong to the specified node in a particular storage area of the receiver or to update the same contents already in a storage area.

For example, the receiving side can receive the service structure information shown in FIG. 29 then the user can allocate contents that belong to News and Sports in Storage Area A and Storage Area B respectively, and store the remaining contents in Storage Area C.

By doing so, the user on the receiving side does not manage contents without knowing the structure of contents but uses the service structure information from the sending side and contents management by the sending side to manage contents.

Figure 30:
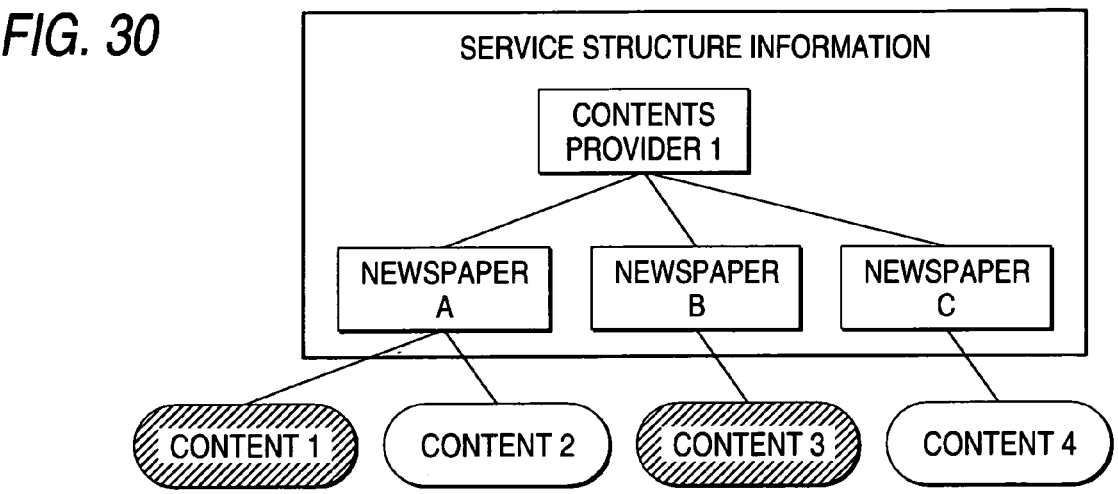
FIG. 30 shows service structure information for automatic storage according to the fifth embodiment of the invention.

FIG. 30 shows a case where the receiving side owns an automatic storage application and automatically stores particular contents. Note that automatic storage in the invention covers automatic storage of contents and automatic update of the same contents (in case the contents identifier is the same or both the contents identifier and the contents version are the same).

In this case, the sending side transmits:

(1) Service structure information shown in FIG. 30 and (2) Service information storing reference information and contents information. The sending side incorporates the automatic storage flag of the contents (Content 1, Content 3) in the contents information in the service information being transmitted. On receiving the data, the receiving side executes the automatic storage application.

The receiving side automatically stores Content 1 and Content 3 that have been received. The receiving side does not automatically store Content 2 that has been received but display the subscription guide to Newspaper A or store the subscription guide alone. The receiving side does not automatically store Content 4 that has been received but stores the subscription guide to Newspaper C.

In case the receiving side has received content that are not automatically stored, the receiving side may store or present the subscription guide to the service referenced by the contents as well as the information on the service referenced by the contents. Thus, any operation except storage of contents is allowed.

A form is possible where, for example, the subscription guide to Newspaper A and the guide to Content 2 are stored on receiving Content 1, no operation is performed on receiving Content 2, the subscription guide to Newspaper B is stored on receiving Content 3, and no operation is performed on receiving Content 4.

In case Content 2 and Content 4 perform content-based charging, it is possible to announce that some contents in Newspaper A and Newspaper C are not automatically stored or updated when Content 2 and Content 4 are received.

In this case, contents can be automatically stored independently of the service structure information. When contents are received, action may be taken utilizing the service structure information at two levels, "automatic storage" or "non-automatic storage," and "subscription guide utilizing service structure information" or "no operation" and so on.

Figure 31:
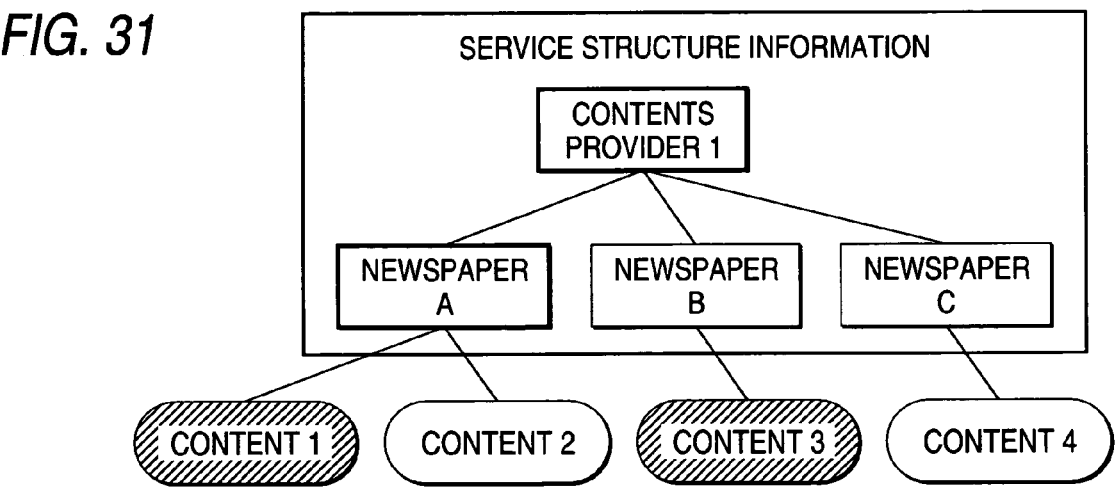
FIG. 31 shows service structure information for automatic storage via node specification according to the fifth embodiment of the invention.

FIG. 31 shows a case where the sending side sets automatic storage of contents and automatic storage on nodes and the receiving side owns an automatic storage application to perform automatic storage processing.

In this case, the sending side transmits:

(1) Service structure information shown in FIG. 31 and (2) Service information storing reference information and contents information (the automatic storage flags for the contents, Content 1, Content 3 are stored in the contents information in the service information). The sending side incorporates the information on a particular node (Newspaper A) that may be automatically stored in the service structure information being transmitted.

On receiving the data, the receiving side executes an automatic storage application. The receiving side, on receiving Content 1, automatically stores or updates Content 1 and uses Content 1 as Newspaper A, since both service structure information and contents can be automatically stored. The receiving side, on receiving Content 2, displays the storage/ update guide or store the subscription guide alone, since only the service structure information (Newspaper A) can be automatically stored. The receiving side, on receiving Content 3, automatically stores or updates Content 3 but cannot use Content 3 as Newspaper B, since the contents alone can be automatically updated. The receiving side, on receiving Content 4, performs no operation since Content 4 cannot be automatically stored.

The receiving side, on receiving Content 3, may not automatically store Content 3, since Newspaper B to which Content 3 belongs cannot be automatically stored.

The receiving side, on receiving Content 3, may display the subscription guide to Newspaper B.

In this way, the receiving side can automatically store contents that belong to a node in the service structure information specified by the sending side and use the contents as contents that belong to the node. The receiving side, on receiving contents for a node n the service structure information on which the contents are dependent, can take action at one of the four levels as appropriate.

Figure 32:
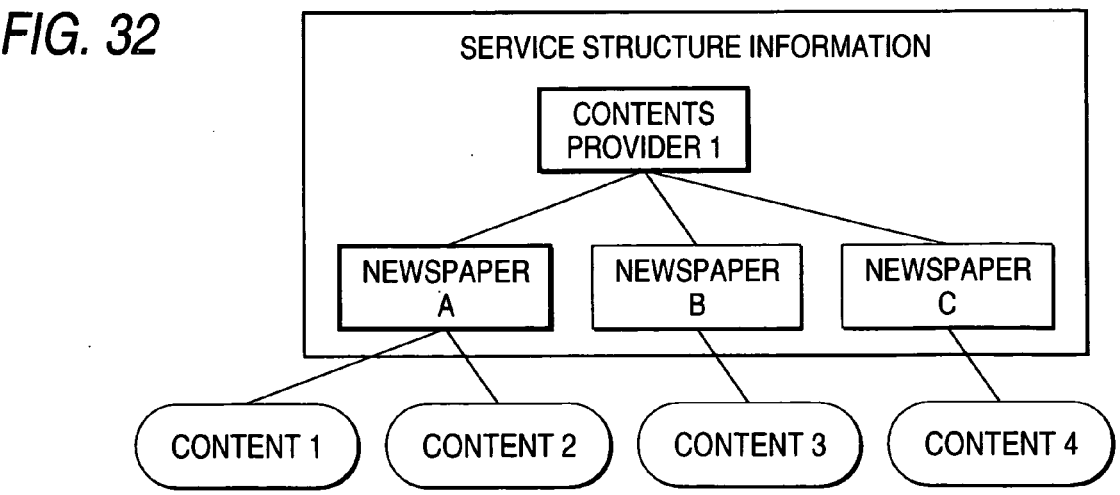
FIG. 32 shows service structure information for automatic storage via node specification from the receiving side according to the fifth embodiment of the invention.

FIG. 32 shows a case where the receiving side subscribes to a particular node.

In this case, the sending side transmits:

(1) Service structure information shown in FIG. 32 and (2) Service information storing reference information and contents information (the automatic storage flags for the contents, Content 1, Content 3 are stored in the contents information in the service information). The receiving side executes an automatic storage application as well as sets subscription to a particular node in the service information (Newspaper A).

Then the receiving side automatically stores or updates Content 1 but does not automatically store the remaining contents.

In this way, the user can select an arbitrary node in the service structure information from the sending side to automatically store the contents that belong to the node, thereby reducing the load of operation of the user on the receiving side. The sending side can permit the user that has selected a node to automatically store contents.

Figure 33:
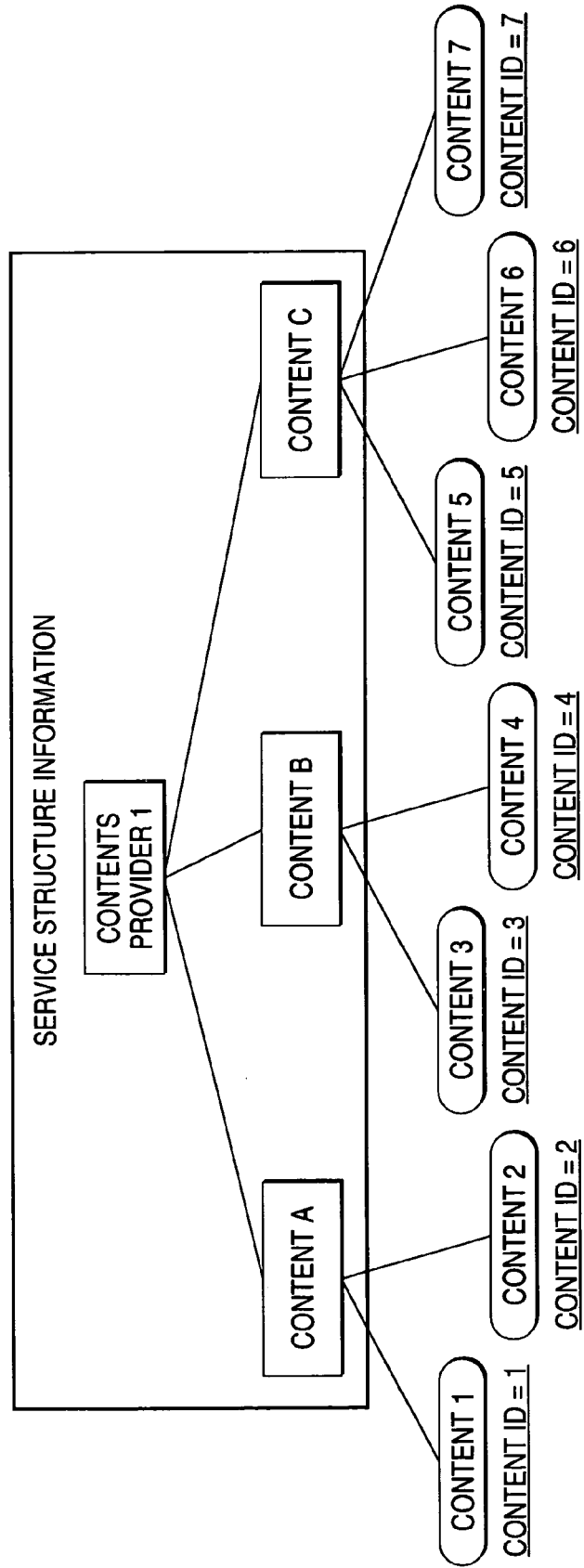
FIG. 33 shows service structure information for determining the identity of contents according to the fifth embodiment of the invention.

In case a contents provider provides the same contents to a plurality of broadcast stations, it is possible to make effective the storage of contents on the receiving side by transmitting the service structure information as shown in FIG. 33. Each node in the service structure information indicates that the same contents reference the node. The sending side transmits the service structure information together with service information storing reference information and contents information.

The service structure information indicates for example that Content 1 and Content 2 are identical as Content A even though the value of CONTENT_ID to identify the contents differs between Content 1 and Content 2. The receiving side executes an application that processes each content that references the node contents as the same content in order to avoid duplicated storage. Contents Provider 1 does not have to use a single CONTENT_ID value to identify contents between broadcast stations when broadcasting Content A from a plurality of separate broadcast stations. Reference to Content A of a node in the service structure information indicates that Content 1 and Content 2 are the same so that it is not necessary to match CONTENT_ID.

Assume Broadcast Station A has broadcast Content A by using CONTENT_ID=1 (Content 1) and Broadcast Station B has broadcast Content B by using CONTENT_ID=2 (Content 2). In this case, the receiver must store Content A as Content 1 and Content 2 separately in case an application is not available that determines the identity of the service structure information or contents shown in FIG. 33. Once such an application is provided, it is possible to store either Content 1 or Content 2 as Content A, thereby allowing efficient use of storage capacity.

A contents provider has only to manage the structure of contents and a broadcast station to manage transmission of contents, thus allowing management to be shared without knowing the structure of each other thus upgrading the work efficiency. It is possible to provide a rule to delete an unnecessary content in case seemingly separate contents are determined to be the same and to delete either of the contents according to the rule. This allows efficient use of storage capacity.

Similarly, in case contents are stored in the receiving side in advance, or pre-installed, and the reference information of the contents references a particular node in the service structure information and the contents provider knows the identifier to identify the referenced node, it is possible to use the node to utilize the service structure information in order to show that the pre-installed contents is the same as the contents about to be sent.

While the upper layer of Content A is Contents Provider 1 in FIG. 33, a layer of information to group contents may be inserted between Contents Provider 1 and Content A or Content B and so on.

In the sixth embodiment, a particular example is described where service information storing service structure information, reference information and contents information is transmitted by using SI.

Figure 34:
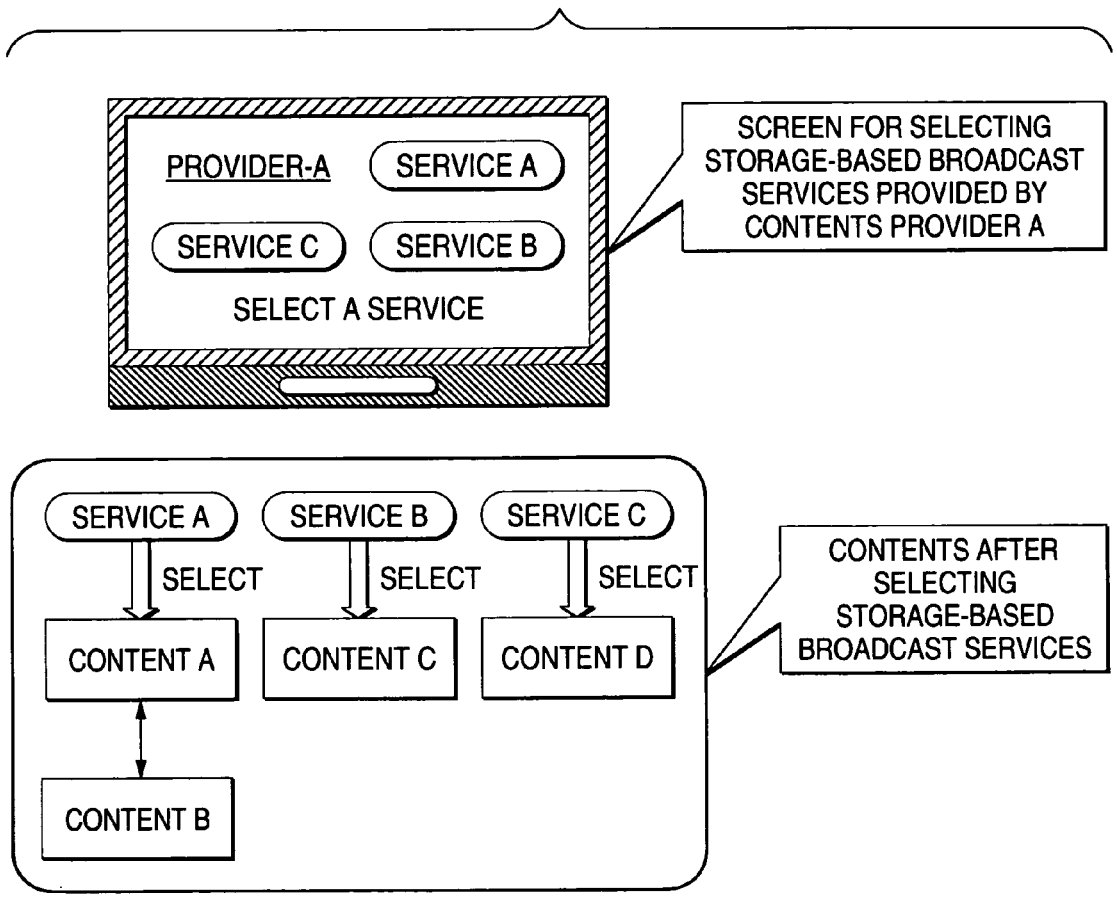
FIG. 34 shows an example of service implementation in a broadcast system according to a sixth embodiment.

As shown in FIG. 34(a), three storage-based broadcast applications, Service A, Service B, and Service C from the contents provider (information provider) A are displayed on the selection screen of the receiver and the user selects viewing of desired contents on the screen. FIG. 34(b) shows stored contents that can be viewed in case each service is selected. For example, selecting Service A on the screen allows viewing of Content A and Content B already stored in the receiver.

To implement such a storage-based broadcast application by using ERT, event_relation_id and relation_type of the ERT defined as a standard are defined as shown in FIG. 43 in order to show that the ERT is a "storage-based broadcast service" and its structure is "presented service description" (indicating service structure information).

The ERT (Event Relation Table) is described in Chapter 3, the ARIB STD-B10 version 1.2. The data structure of the ERT is shows in FIG. 46.

An information provider (Company A) must make information provider definition as to items shown in FIG. 36. Such items are information provider identifier of Company A, ID of the service to be provided (node), information providers the contents are related to, reference to events and nodes. Note that the information provider identifier may be predetermined in terms with other information providers.

In this embodiment, service structure information is transmitted using the ERT of SI. The identifier to identify the information provider (contents provider) is represented by using information_provider_id, the identifier to identify the type of broadcast service by using event_relation_id in the ERT, and the identifier to identify the service provided by the information provider by using node_id in the ERT.

FIG. 37 shows an example where service structure information consisting of Information Provider A, Service A, Service B and Service C is described in the ERT.

Contents reference information is described in the reference descriptor of SI. The reference information descriptor is described in Chapter 3, the ARIB STD-B10 version 1.2. The data structure of the reference information descriptor is shown in FIG. 47. FIGS. 39, 40 and 41 show examples of creation of reference information descriptors for Contents A and B, C, and D, respectively. An information provider may be the same as a broadcast operator.

Reference information of the contents described in the reference information descriptor is passed from an information provider to a broadcast operator in advance. The broadcast operator, on receiving the information, allocates contents identifiers (content_id) to the contents. FIG. 38 shows an example thereof.

The reference information descriptor is stored in the EIT data contents descriptor (selector area) (refer to Chapter 2, ARIB STD-B10) and the EIT data contents descriptor is stored in the position where a descriptor in EIT is stored for transmission. FIG. 44 shows the data structure of EIT. FIG. 45 shows the data structure of the EIT data contents descriptor. FIG. 42 shows the structure arib_bxml_info( ) as a description example of the selector area of the EIT data contents descriptor. In content_id is described the identifier of the contents where reference information is described in the reference information descriptor. It is possible to describe more than one reference information descriptor for a single content.

Figure 35:
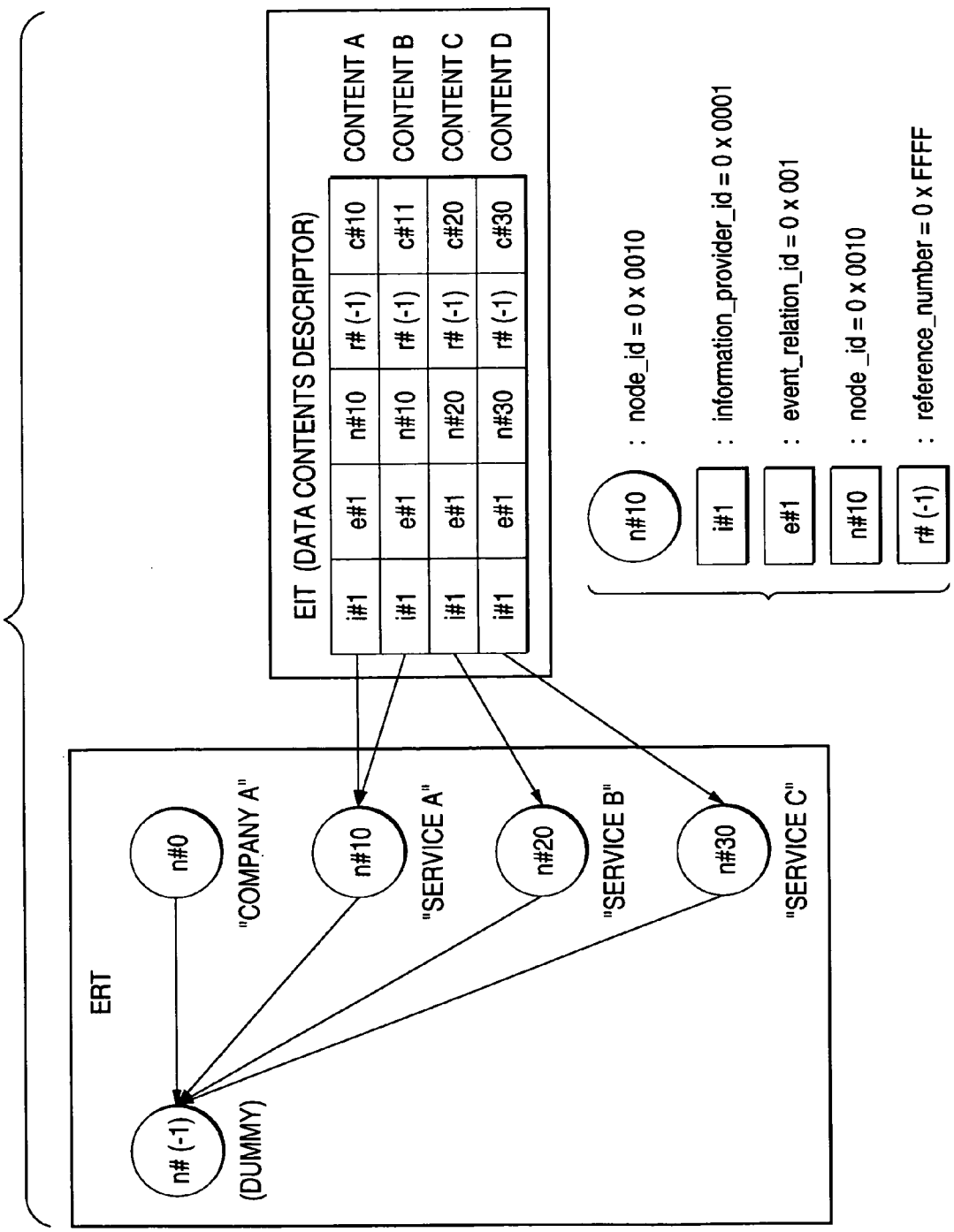
FIG. 35 shows service structure information reproduced by a receiver according to the sixth embodiment.

A receiver that has received the ERT and the EIT data contents descriptor can reproduce service structure information from the ERT and reproduce the information on the node (n#10), event (e#1) and information provider (i#1) to which each content is related as shown in FIG. 35. This obtains data addition service structure information.

In this way, by using SI such as ERT and reference information descriptor, it is possible to transmit service structure information and service information service information storing service structure information, reference information and contents information to the receiving side.

In the seventh embodiment, a case is described where automatic storage information is transmitted to the receiving side by using the EIT data contents descriptor.

The arib_bxml_info( ) structure of the selector area of the EIT data contents descriptor is expanded as shown in the cross-hatched section in FIG. 42 so that the viewer can store contents easily even in case the broadcast operator is different from the contents provider.

Extended items as follows:

auto_storage_flag (automatic storage flag): Indicates whether to automatically store the contents. When the value of auto_storage_flag is 0, automatic storage of contents is not executed. When it is 1, the contents are automatically stored via the reference information descriptor concerning the subsequent provision of contents. Timing for automatic storage (at EIT reception or program selection) depends on the receiver used.

content_provider_flag (contents provider flag): Indicates whether the operator providing the contents is the same as the broadcast operator broadcasting the contents. When the value of content_provider_flag is 0, this field indicates that the operator providing the contents is the same as the broadcast operator broadcasting the contents or there is no need to describe a contents provider. When the value of content_provider_flag is 0, this field indicates that the operator providing the contents is not the same as the broadcast operator broadcasting the contents.

content_provider_descriptors_length (contents provider descriptor loop length): This is a 12-bit field to specify the total byte length of the subsequent descriptors.

descriptors ( ): In case the operator providing the contents is not the same as the broadcast operator broadcasting the contents, this field stores a reference information descriptor to indicate the contents provider. A plurality of reference information descriptors may be stored.

A receiver that has received data contents represented by content_id (contents identification: 32-bit field to identify the data broadcast program) in case file_storable_flag (file storable flag: Flag to indicate whether the data broadcast program can store files) in arib_bxml_info( ) of the EIT data contents descriptor is 0 and auto_storage_flag is 1 automatically stores the contents in case the event relation identification (event_relation_id: Identifies service form type), information provider identification (information_provider_id: Identification of operator that provides the contents) and node identification (node_id: Identifies the provided service) are identical with these identifications registered in the receiver.

Assume, for example, via reception of ERT, the storage-based broadcast service (binary data) has been registered in the receiver as the event-related identification (service form type), the storage-based broadcast service operator A (binary data) as the information provider identification (information provider), and Service A (binary data) as the node identification (provided service).

In case auto_storage_flag of the EIT data contents descriptor of the received contents is 1 and "storage-based broadcast service," "storage-based broadcast service operator A," and "service A" are described in the contents, the contents are automatically stored in the receiver.

In case auto_storage_flag of the EIT data contents descriptor of certain contents is 1 and "storage-based broadcast service," "storage-based broadcast service operator A," and "service B" are described in the contents, the contents are not automatically stored.

In this way, it is possible to instruct automatic storage on the receiving side by using the EIT data contents.

As understood from the foregoing description, a broadcast system according to the invention allows per-service contents management.

It is possible to perform per-service control from the sending side to the receiving side, and to exclusively control storage areas on the receiving side per service or control the validity term of contents per service.

It is possible for the receiving side to use service structure information sent from the sending side to perform per-service contents management, control storage areas on the receiving side per service or control the validity term of contents per service.

By appending the automatic storage flag to contents, it is possible to manage contents that belong to a service in combination with the automatic storage flag.

By using the service structure information to determine the identity of the contents to be broadcast, it is possible to identify contents via only an indentifier to identify a node in the service structure information to be generated on the receiving side without considering the information used by contents providers or broadcast operators to identify contents in data transmission. On the receiving side, it is possible to recognize the contents transmitted between different broadcast stations as the same contents or recognize the pre-installed contents to be the same as the contents about to be broadcast. This makes efficient the storage processing and storage capacity.

The invention claimed is:

1. A storage-based digital broadcast system for transmitting contents of a content provider comprising:
   service structure information;
   a sending side for transmitting said service structure information;
   a receiving side, separated from said sending side, for receiving, storing, and managing said service structure information;
   wherein said service structure information describes the relational structure between services provided by said content provider and reference information associating the contents with the services described in said service structure information.

2. A storage-based broadcast system according to claim 1, characterized in that the sending side transmits said service structure information and reference information before transmission of said contents and that the receiving side receives and stores said service structure information and reference information and uses the information for management of the storage of contents to be received later.

3. A storage-based broadcast system according to claim 1, characterized in that the sending side transmits said reference information before transmission of said contents and transmits said service structure information after transmission of said contents and that the receiving side combines said reference information that has been stored and said service structure information that has been received later and uses the information for management of the storage of said contents.

4. A storage-based broadcast system according to claim 1, characterized in that said contents contains non-stream format data contents.

5. A storage-based broadcast system according to claim 1 or 4, characterized in that said contents contains a stream format AV data and that said AV data is converted to file format on the receiving side and stored as AV contents.

6. A storage-based broadcast system according to claim 1, characterized in that said service structure information is transmitted via SI (Service Information).

7. A storage-based broadcast system according to claim 4, characterized in that said service structure information is transmitted as said SI by using the ERT (Event Relation Table).

8. A storage-based broadcast system according to claim 1, characterized in that the type information for representing the meaning of the service structure information and for selecting the operation on the receiving side is appended to said service structure information.

9. A storage-based broadcast system according to claim 1, characterized in that said reference information is transmitted via SI.

10. A storage-based broadcast system according to claim 9, characterized in that said reference information is transmitted as said SI by using a reference descriptor.

11. A storage-based broadcast system according to claim 1, characterized in that said receiving side exclusively manages the storage areas of said contents per service.

12. A storage-based broadcast system according to claim 1, characterized in that said receiving side manages the validity term of stored contents per service.

13. A storage-based broadcast system according to claim 1, characterized in that said receiving side manages the value of stored contents per service.

14. A storage-based broadcast system according to claim 1, characterized in that said sending side specifies a particular service in said service structure information and that the receiving side performs processing tailored to the contents related to the specified service.

15. A storage-based broadcast system according to claim 1, characterized in that said receiving side specifies a service in said service structure information and stores only the contents related to the specified service.

16. A storage-based broadcast system according to claim 1, characterized in that said sending side appends an automatic storage flag to contents in said reference information and that the receiving side stores or updates the contents with said automatic storage flag appended.

17. A storage-based broadcast system according to claim 1, characterized in that said sending side appends an automatic storage flag to contents in said reference information and specifies a particular service in said service structure information and that the receiving side automatically stores or updates the contents with said automatic storage flag appended among the contents related to the specified service.

18. A storage-based broadcast system according to claim 1, characterized in that said sending side appends an automatic storage flag to contents in said reference information and that said receiving side specifies a service in said service structure information and automatically stores or updates the contents with said automatic storage flag appended among the contents related to the specified service.

19. A storage-based broadcast system according to claim 16, 17 or 18, characterized in that said automatic storage flag is transmitted via SI.

20. A storage-based broadcast system according to claim 19, characterized in that an EIT (Event Information Table) is used to transmit said automatic storage flag as said SI.

21. A storage-based broadcast system according to claim 1, characterized in that said sending side specifies the relationship between the same contents in said service structure information and that said receiving side avoids duplicated storage of the same contents based on said service structure information.

22. A transmitter of a storage-based digital broadcast system wherein contents transmitted from a sending side are stored on a receiving side, separated from said sending side, then reproduced, characterized in that said transmitter comprises service structure information generating means for generating service structure information representing a relational structure between services provided by contents providers, reference information generating means for generating reference information for associating the contents with the service described in said service structure information, service information adding means for adding said reference information to service information, and multiplexing/transmission means for multiplexing service information containing said reference information and said service structure information into contents and transmitting the resulting data.

23. A receiver of a storage-based digital broadcast system wherein contents transmitted from a sending side are stored on a receiving side, separated from said sending side, then reproduced, characterized in that said receiver comprises receiving/demultiplexing means for demultiplexing contents, service structure information describing the relational structure between services provided by contents providers and service information containing reference information associating contents with the service described in said service structure information from received signals, contents storage means for storing demultiplexed contents, service structure storage means for storing demultiplexed service structure information, service information storage means for storing said demultiplexed service information, and service management means for managing storage of said contents by using service structure information and reference information.

24. A receiver according to claim 23, characterized in that said receiver comprises automatic storage management means for managing automatic storage of contents in said contents storage means based on the automatic storage flag appended to said service information.

* * * * *